US010760559B2

(12) United States Patent
Irie et al.

(10) Patent No.: US 10,760,559 B2
(45) Date of Patent: Sep. 1, 2020

(54) CONTROL VALVE FOR VARIABLE DISPLACEMENT COMPRESSOR

(71) Applicant: TGK CO., LTD., Tokyo (JP)

(72) Inventors: Kazuhiro Irie, Tokyo (JP); Masaaki Tonegawa, Tokyo (JP); Hiroshi Hamada, Tokyo (JP)

(73) Assignee: TGK CO., LTD., Tokyo (JP)

( * ) Notice: Subject to any disclaimer, the term of this patent is extended or adjusted under 35 U.S.C. 154(b) by 84 days.

(21) Appl. No.: 15/621,352

(22) Filed: Jun. 13, 2017

(65) Prior Publication Data

US 2017/0356430 A1     Dec. 14, 2017

(30) Foreign Application Priority Data

Jun. 13, 2016 (JP) .................................. 2016-117375
Aug. 10, 2016 (JP) .................................. 2016-157617

(51) Int. Cl.
*F04B 27/18* (2006.01)
*F04B 49/06* (2006.01)
(Continued)

(52) U.S. Cl.
CPC .......... *F04B 27/1804* (2013.01); *F04B 49/06* (2013.01); *F04C 28/125* (2013.01);
(Continued)

(58) Field of Classification Search
CPC ................. F04B 27/1804; F04B 49/06; F04B 2027/1813; F04B 2027/1827;
(Continued)

(56) References Cited

U.S. PATENT DOCUMENTS 6,358,017 B1 * 3/2002 Ota ..................... F04B 27/1804
417/222.2
2005/0211939 A1    9/2005 Morisawa et al.
(Continued)

FOREIGN PATENT DOCUMENTS

JP    2005273548        10/2005
JP    2010-101202 A     5/2010
(Continued)

OTHER PUBLICATIONS

Office Action of JP Application No. 2016-157617, dated Jan. 28, 2020, 9 pages.

*Primary Examiner* — Philip E Stimpert
(74) *Attorney, Agent, or Firm* — Muncy, Geissler, Olds & Lowe, P.C.

(57) ABSTRACT

A control valve includes: a first valve to control a flow rate of refrigerant flowing from a discharge chamber to a control chamber of a compressor; a second valve to control a flow rate of the refrigerant flowing from the control chamber to a suction chamber; a solenoid to generate a drive force in a first valve closing direction and a second valve opening direction; a biasing member to generate a biasing force in an first valve opening direction and a second valve closing direction; and a pressure sensing part to sense a pressure in the suction chamber or the control chamber, and generate a counterforce against the drive force. A state in which both of the first and second valves are open is present during an increase in the current supplied to the solenoid from zero to an upper limit current value, and an increase rate of an opening degree of the first valve is increased during a decrease in the current supplied to the solenoid, a predetermined lower limit current value being an inflection point of the increase.

10 Claims, 20 Drawing Sheets

(51) Int. Cl.
*F04C 28/12* (2006.01)
*F25B 49/02* (2006.01)
*F16K 31/06* (2006.01)

(52) U.S. Cl.
CPC ............ *F16K 31/06* (2013.01); *F25B 49/022* (2013.01); *F04B 2027/1813* (2013.01); *F04B 2027/1827* (2013.01); *F04B 2027/1831* (2013.01); *F04B 2027/1854* (2013.01); *F04B 2027/1859* (2013.01); *F04B 2027/1877* (2013.01); *F04B 2027/1881* (2013.01); *F04B 2203/0401* (2013.01)

(58) Field of Classification Search
CPC ...... F04B 2027/1831; F04B 2027/1854; F04B 2027/1859; F04B 2027/1877; F04B 2027/1881; F04B 2203/0401
See application file for complete search history.

(56) References Cited

U.S. PATENT DOCUMENTS

| | | | |
|---|---|---|---|
| 2005/0254961 A1* | 11/2005 | Kawamura | ......... F04B 27/1804 417/222.2 |
| 2006/0237552 A1 | 10/2006 | Umemura et al. | |
| 2009/0108221 A1 | 4/2009 | Umemura et al. | |
| 2013/0276920 A1 | 10/2013 | Sakakibara et al. | |
| 2013/0291963 A1 | 11/2013 | Futakuchi et al. | |
| 2015/0004010 A1 | 1/2015 | Saeki et al. | |
| 2015/0010410 A1* | 1/2015 | Saeki | ................... F04B 49/225 417/228 |
| 2015/0345655 A1* | 12/2015 | Higashidozono | ... F16K 31/0624 137/624.27 |

FOREIGN PATENT DOCUMENTS

| | | |
|---|---|---|
| JP | 2015214914 A | 12/2015 |
| WO | WO-2004/065789 A1 | 8/2004 |

* cited by examiner

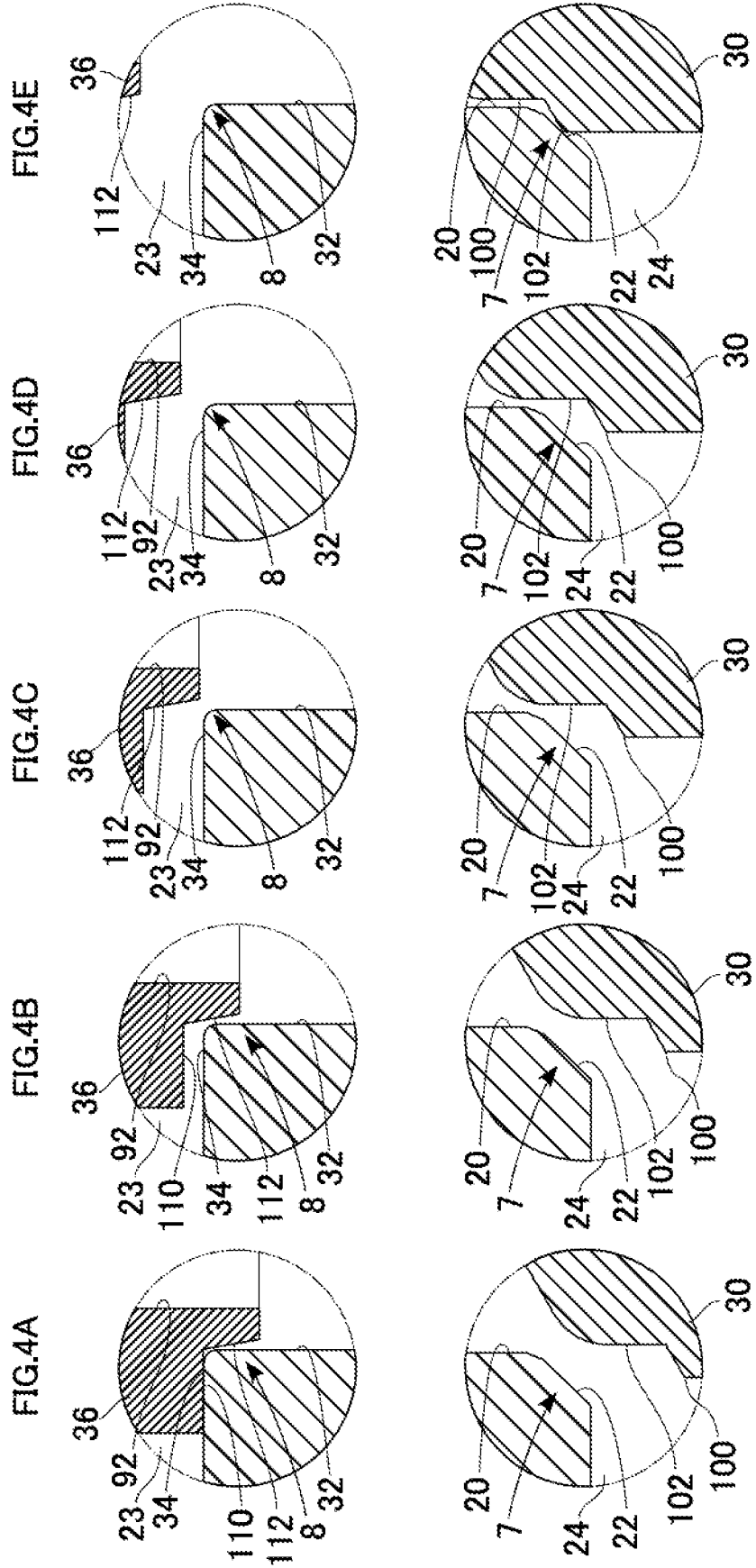

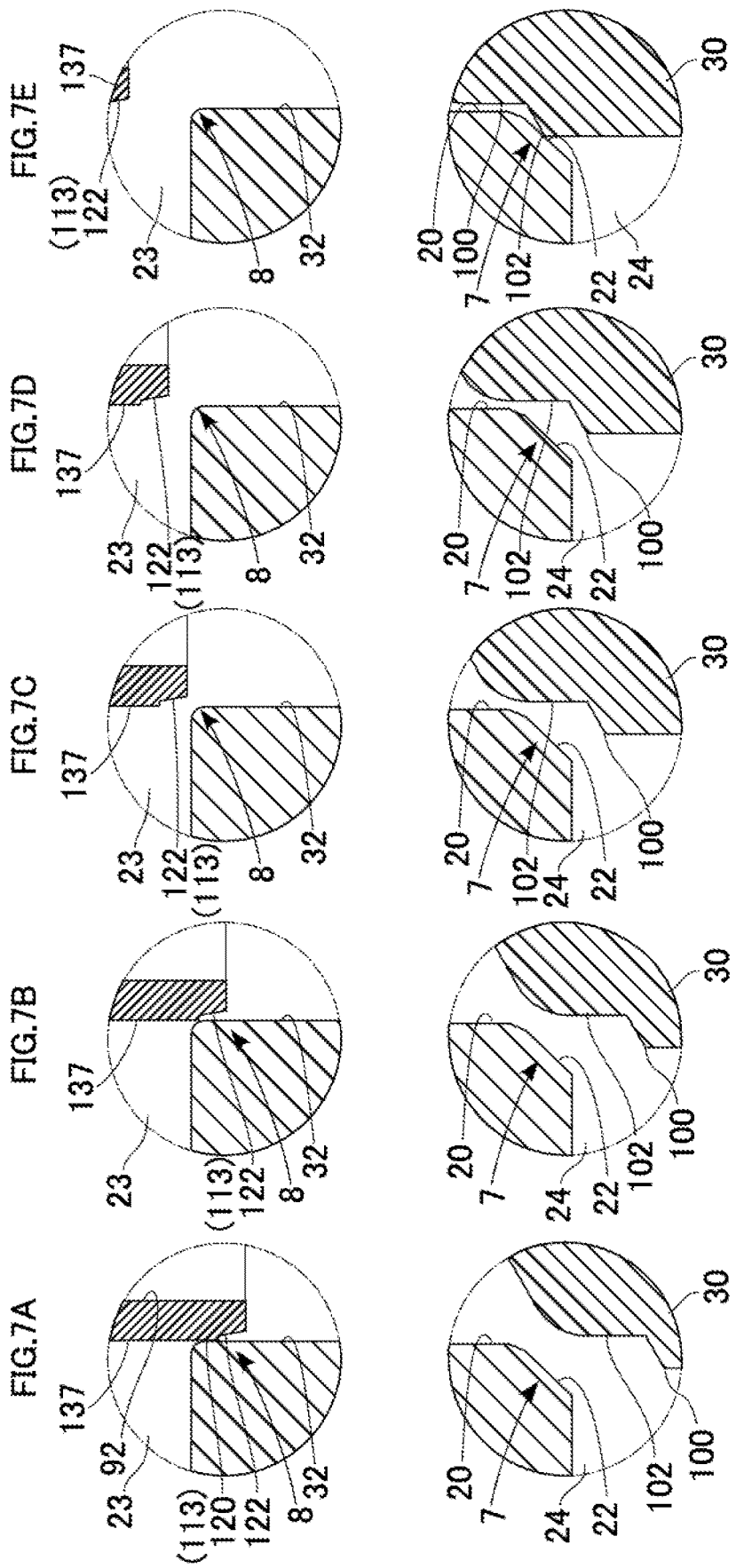

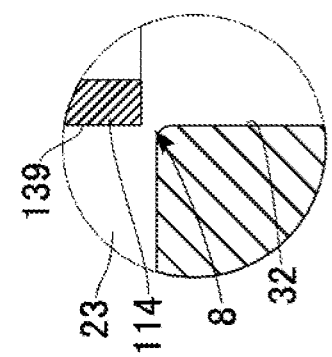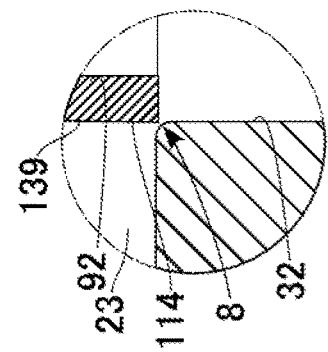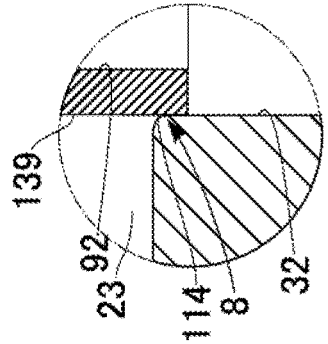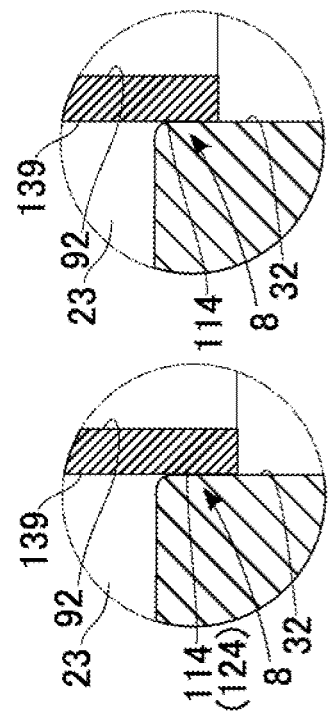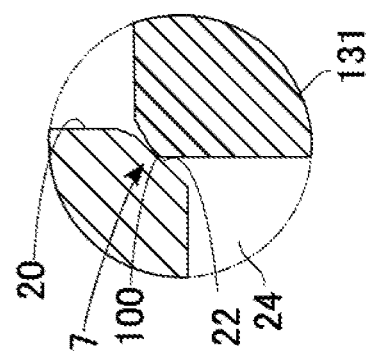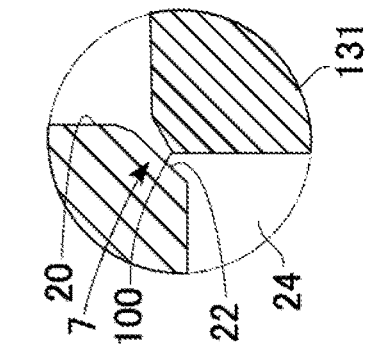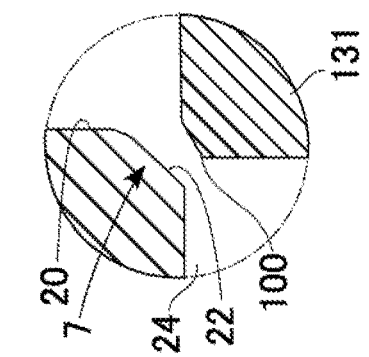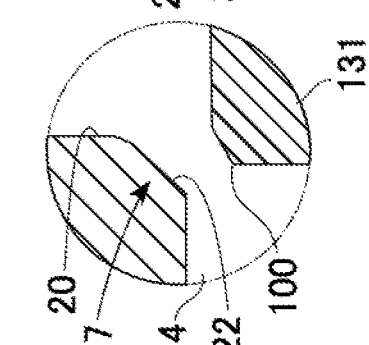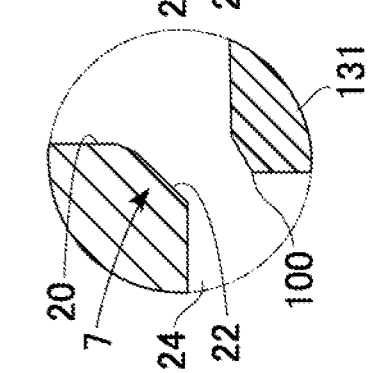

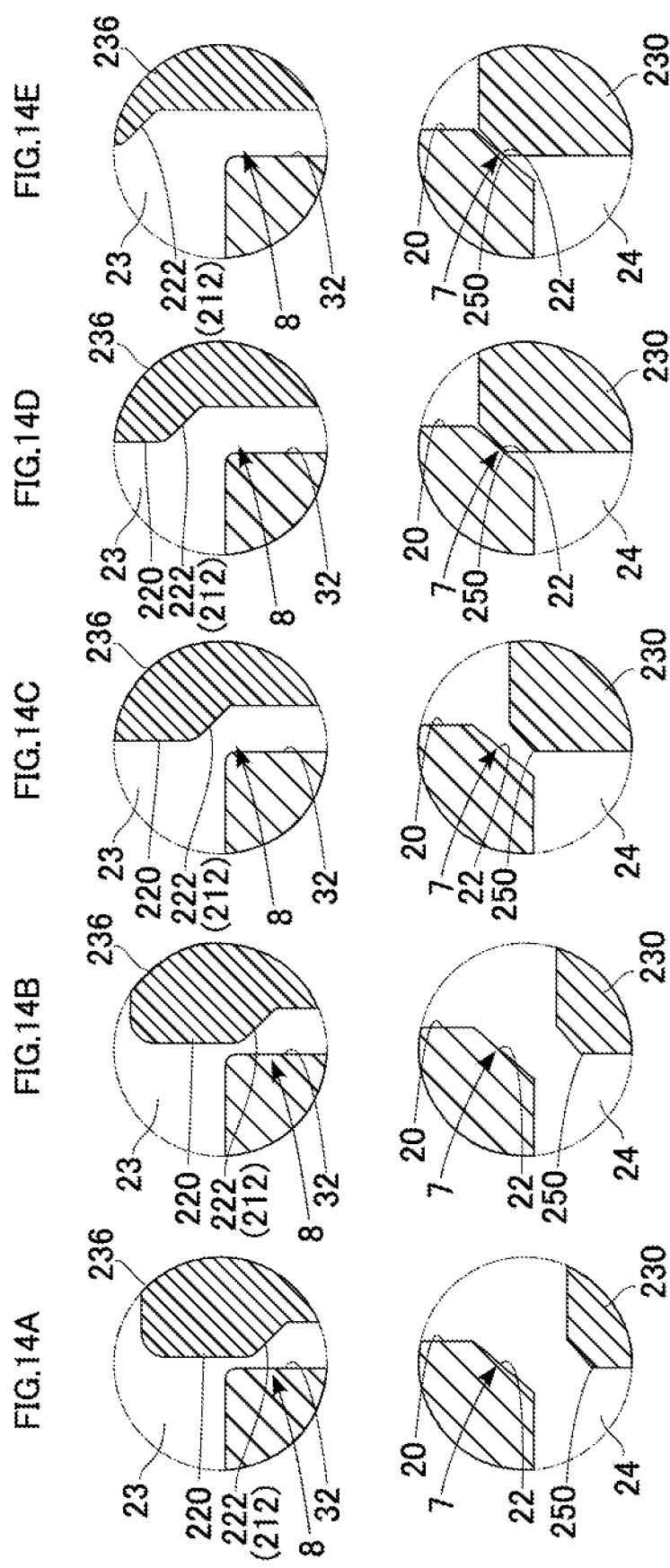

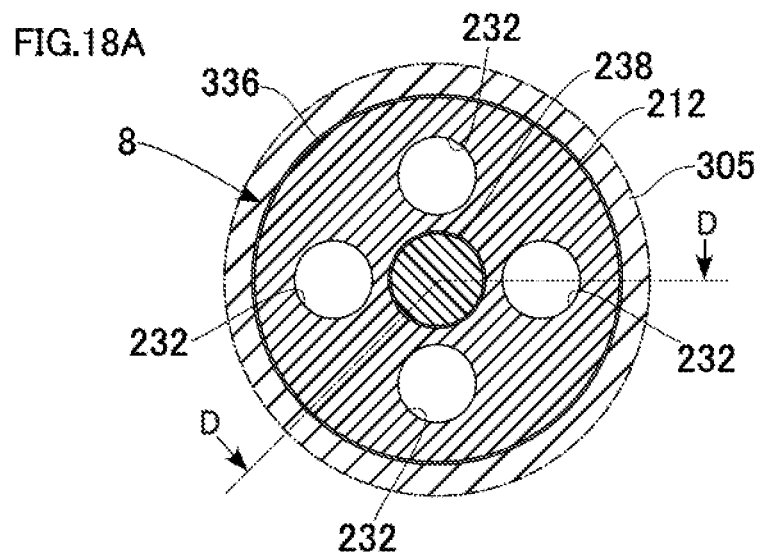
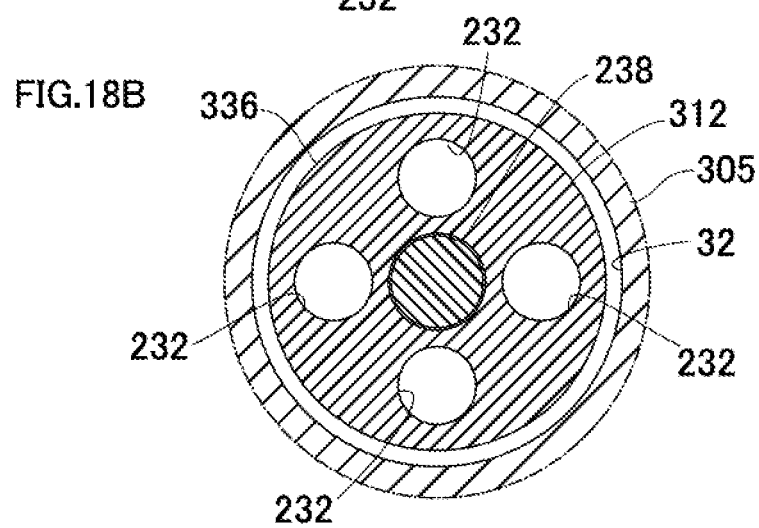
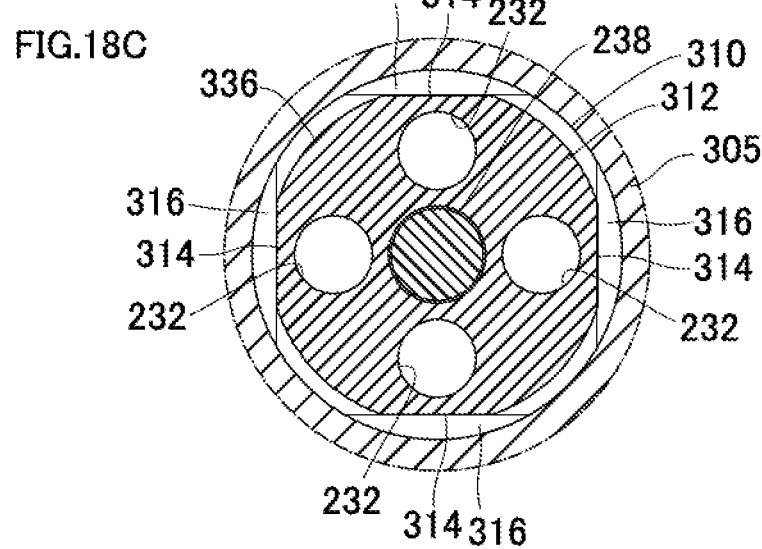

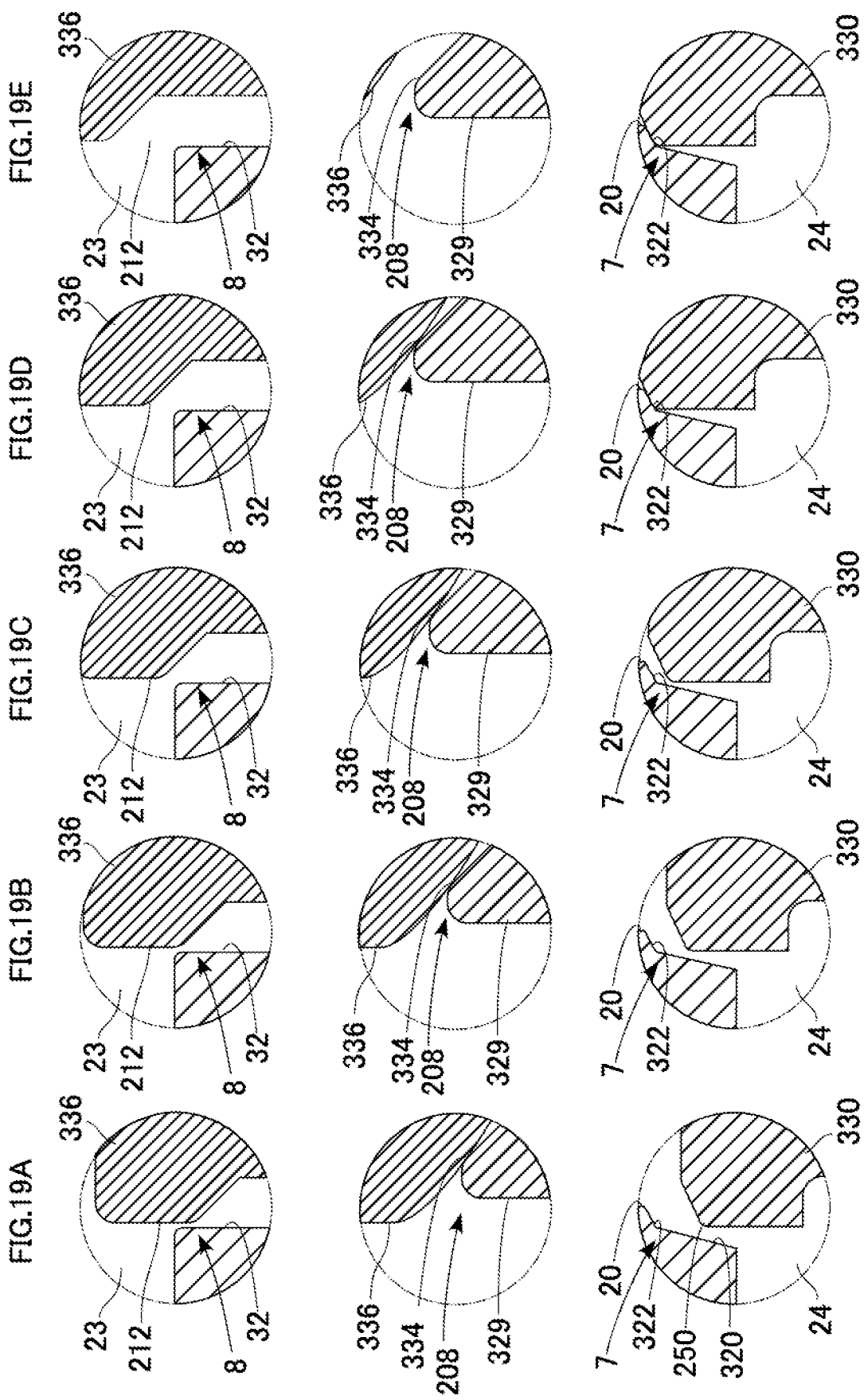

CONTROL VALVE FOR VARIABLE DISPLACEMENT COMPRESSOR

CLAIM OF PRIORITY

This application claims priority to Japanese Patent Application No. 2016-117375 filed on Jun. 13, 2016 and Japanese Patent Application No. 2016-157617 filed on Aug. 10, 2016, which are incorporated herein by reference.

BACKGROUND OF THE INVENTION

1. Field of the Invention

The present invention relates to a control valve for controlling the discharging capacity of a variable displacement compressor.

2. Description of the Related Art

An automotive air conditioner generally includes a compressor, a condenser, an expander, an evaporator, and so forth arranged in a refrigeration cycle. The compressor is, for example, a variable displacement compressor (hereinafter also referred to as simply a "compressor") capable of varying the refrigerant discharging capacity in order to maintain a constant level of cooling capacity irrespective of the engine speed. In this compressor, a piston for compression is linked to a swash plate, which is mounted onto a rotational shaft driven by an engine. The angle of the swash plate is changed to change the stroke of the piston, by which the refrigerant discharging rate is regulated. The angle of the swash plate is changed continuously by supplying part of the discharged refrigerant into a hermetically-closed control chamber and thus changing the balance of pressures working on both faces of the piston.

The pressure (referred to as a "control pressure" below) in this control chamber is controlled by a control valve provided between a discharge chamber and the control chamber of the compressor and by a fixed orifice provided between the control chamber and a suction chamber, for example (refer to JP 2010-101202 A, for example). The fixed orifice adequately releases the refrigerant in the control chamber so that the control pressure will not become excessively high, while the control valve regulates the flow rate of the refrigerant introduced from the discharge chamber to the control chamber so as to change the discharge capacity of the compressor. The refrigerant contains oil, which also provides functions of lubricating and cooling internal mechanisms while circulating in the compressor as described above. The compressor is thus provided with an internal circulation path for circulation of the refrigerant inside the compressor in addition to an external circulation path for circulation of the refrigerant in the refrigeration cycle.

RELATED ART LIST

Japanese Patent Application Publication No. 2010-101202

Note that the internal circulation in the compressor does not contribute to the refrigeration cycle. Thus, if the internal circulation is unnecessarily large, it may be difficult to provide sufficient external circulation in a variable capacity operation range (during control of the compressor), which may lead to lower power of the air conditioner. In addition, it is desirable to flexibly switch the control of the compressor depending on the condition of the vehicle, such as a condition in which the compressor should be quickly switched to minimum capacity operation where the compressor operates with a minimum capacity owing to an increase in the vehicle load or a condition in which the compressor should be quickly started from the minimum capacity operation, while taking the power of the air conditioner into account.

SUMMARY OF THE INVENTION

The present invention has been made in view of these circumstances, aims at providing a control valve suitable for maintaining high operating efficiency of a compressor and efficiently switching the operation of the compressor.

One embodiment of the present invention relates to a control valve applicable to a variable displacement compressor having a suction chamber, a discharge chamber, and a control chamber, and having a discharge capacity varied by regulating a pressure in the control chamber. The control valve includes: a first valve provided between the discharge chamber and the control chamber, to control a flow rate of refrigerant flowing from the discharge chamber to the control chamber; a second valve provided between the control chamber and the suction chamber, to control a flow rate of the refrigerant flowing from the control chamber to the suction chamber; a solenoid to generate a drive force in a closing direction of the first valve and an opening direction of the second valve depending on an amount of supplied current; a biasing member to generate a biasing force in an opening direction of the first valve and a closing direction of the second valve; and a pressure sensing part to sense a pressure in the suction chamber or a pressure in the control chamber, and generate a counterforce against the drive force from the solenoid depending on a magnitude of the sensed pressure. The control valve has such control characteristics that a state in which both of the first valve and the second valve are open is present during a process in which the amount of current supplied to the solenoid is increased from zero to an upper limit current value, and that an increase rate of an opening degree of the first valve is increased during a process in which the amount of current supplied to the solenoid is decreased, a predetermined lower limit current value being an inflection point of the increase.

According to this embodiment, since the control valve has such control characteristics that a state in which both of the first valve and the second valve are open is present, regulation of the opening degrees of the first and second valves allows the internal circulation amount of the refrigerant in the compressor to be small. In addition, according to the control characteristics, the relation between the power supplied to the solenoid and the increase rate of the opening degree of the first valve greatly changes at the lower limit current value that is an inflection point. Thus, the amount of supplied current is changed at the lower limit current value, which allows efficient switching of the operation condition of the compressor.

Another embodiment of the present invention also relates to a control valve. The control valve includes: a first valve provided between the discharge chamber and the control chamber, to control a flow rate of refrigerant flowing from the discharge chamber to the control chamber; a second valve and a third valve provided parallel to each other between the control chamber and the suction chamber, to control a flow rate of refrigerant flowing from the control chamber to the suction chamber; a solenoid to generate a drive force in a closing direction of the first valve and an opening direction of the second valve depending on an amount of supplied current; and a pressure sensing part to sense a pressure in the suction chamber or a pressure in the control chamber, and generate a counterforce against the drive force from the solenoid depending on a magnitude of the sensed pressure. The control valve has such control characteristics that a state in which both of the first valve and the second valve are open is present during a process in which the amount of current supplied to the solenoid is increased from zero to an upper limit current value.

According to this embodiment, since the control valve has such control characteristics that a state in which both of the first valve and the second valve are open is present, regulation of the opening degrees of the first and second valves allows the internal circulation amount of the refrigerant in the compressor to be small. Furthermore, the third valve is in an open state at the startup of the compressor, which allows efficient switching from minimum capacity operation to maximum capacity operation.

BRIEF DESCRIPTION OF THE DRAWINGS

FIGS. 4A to 4E are partially enlarged cross-sectional views illustrating the structures and operations of a main valve element and a sub-valve element;

FIGS. 7A to 7E are partially enlarged cross-sectional views illustrating the structures and operations of valve elements according to a modification;

FIGS. 9A to 9E are partially enlarged cross-sectional views illustrating the structures and operations of valve elements according to a modification;

FIGS. 14A to 14E are partially enlarged cross-sectional views illustrating the structures and operations of a main valve element and a sub-valve element;

FIGS. 18A to 18C are cross-sectional views shown by arrows in FIG. 17 and illustrating a sub-valve element and surrounding structures illustrated in FIG. 17.

FIGS. 19A to 19E are partially enlarged cross-sectional views illustrating operations of a main valve and sub-valves.

DETAILED DESCRIPTION OF THE INVENTION

Figure 1:
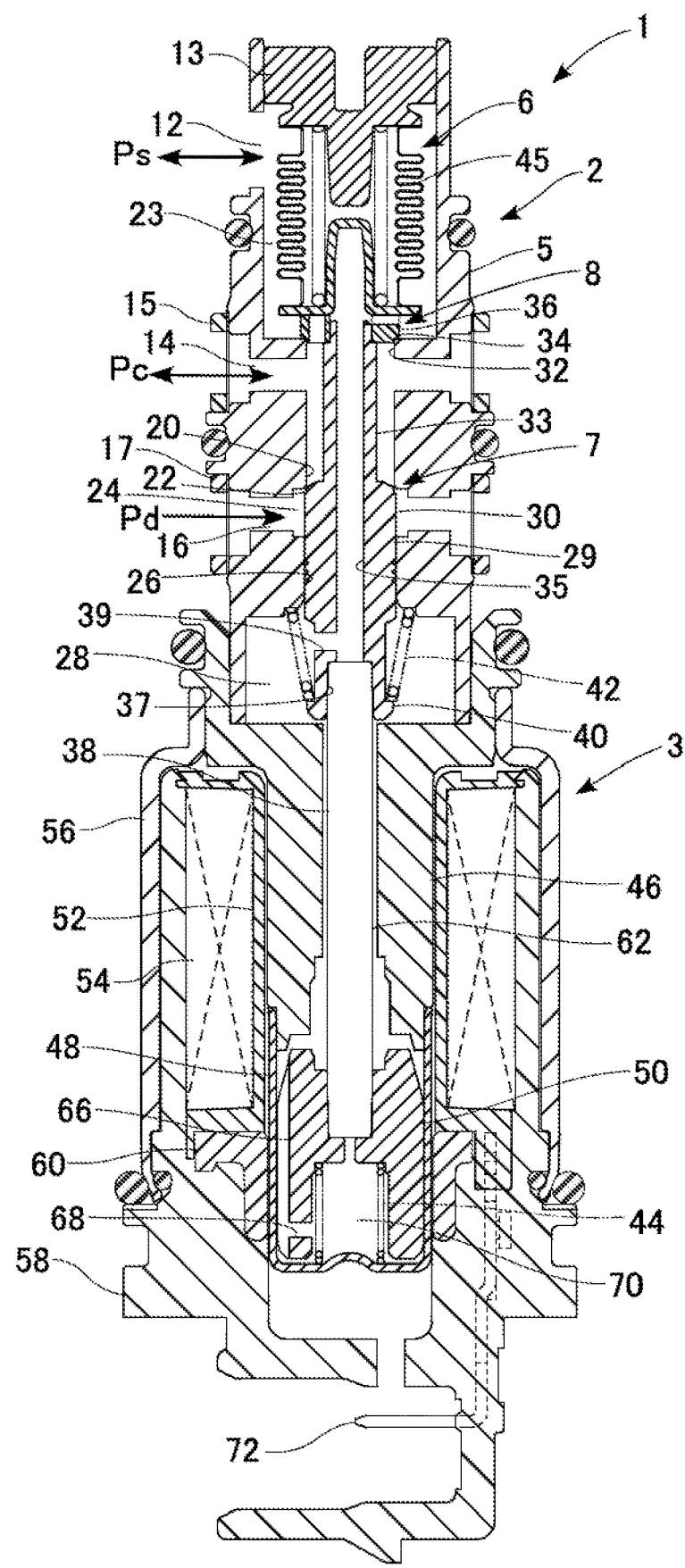
FIG. 1 is a cross-sectional view illustrating a structure of a control valve according to a first embodiment.

Certain embodiments of the invention will now be described. The description is not intended to limit the scope of the present invention, but is to exemplify the invention.

Embodiments of the present invention will now be described in detail with reference to the drawings. In the description below, for convenience of description, the positional relationship in each structure may be expressed with reference to how the structure is depicted in the drawings. In the following embodiments and modifications thereof, components that are substantially the same will be designated by the same reference numerals and redundant description thereof may be omitted as appropriate.

First Embodiment

FIG. 1 is a cross-sectional view illustrating a structure of a control valve according to a first embodiment.

The control valve 1 controls the discharging capacity of a variable displacement compressor (hereinafter simply referred to as a "compressor") installed in a refrigeration cycle of an automotive air conditioner. The compressor compresses refrigerant flowing through the refrigeration cycle into a high-temperature and high-pressure gaseous refrigerant, and discharges the compressed gaseous refrigerant. The gaseous refrigerant is condensed by a condenser (external heat exchanger) and then adiabatically expanded by an expander into a low-temperature and low-pressure spray of refrigerant. The low-temperature and low-pressure refrigerant is evaporated by an evaporator, and the air inside the vehicle is cooled by the evaporative latent heat. The refrigerant evaporated by the evaporator is returned to the compressor. In this manner, the refrigerant circulates through the refrigeration cycle. The compressor has a rotational shaft rotated by an engine of the automobile. A piston for compression is linked to a wobble plate mounted on the rotational shaft. The angle of the wobble plate is changed to change the stroke of the piston and to thus regulate the refrigerant discharging rate. The control valve 1 controls the flow rate of refrigerant introduced from a discharge chamber to a control chamber of the compressor and the flow rate of refrigerant delivered from the control chamber into a suction chamber, to change the angle of the wobble plate and thus the discharging capacity of the compressor.

The compressor is provided with an internal circulation path for circulation of the refrigerant inside the compressor in addition to an external circulation path for circulation of the refrigerant in the refrigeration cycle. Part of the refrigerant introduced into a cylinder of the compressor leaks in the form of so-called blow-by gas through a clearance between the cylinder and the piston into the control chamber. The blow-by gas also contributes to the internal circulation. Although the control chamber in the present embodiment is a crankcase, the control chamber may alternatively be a pressure chamber separately provided in or outside of the crankcase in a modification.

The control valve 1 is a so-called Ps sensing valve configured to control the flow rate of refrigerant introduced from the discharge chamber into the control chamber and the flow rate of refrigerant delivered from the control chamber into the suction chamber, so as to keep a suction pressure Ps (corresponding to a "pressure to be sensed") of the compressor at a preset pressure. The control valve 1 is formed of an integral assembly of a valve unit 2 and a solenoid 3. The control valve 1 is formed of an assembly of a valve unit 2 and a solenoid 3 in an axial direction. The valve unit 2 includes a main valve 7 for controlling the flow rate of refrigerant flowing from the discharge chamber to the control chamber, and a sub-valve 8 for controlling the flow rate of refrigerant flowing from the control chamber to the suction chamber. The main valve functions as a "first valve," and the sub-valve 8 functions as a "second valve." The opening degree of the main valve 7 is regulated during operation of the compressor, so that part of discharged refrigerant is introduced into the control chamber. The sub-valve 8 functions as a so-called bleed valve that becomes fully open at the startup of the compressor to let the refrigerant in the control chamber out to the suction chamber. The solenoid 3 generates a drive force in the closing direction of the main valve 7 and the opening direction of the sub-valve 8 depending on the amount of supplied current. The valve unit 2 has a body 5 having a stepped cylindrical shape, and contains the main valve 7, the sub-valve 8 and a power element 6 inside the body 5. The power element 6 functions as a "pressure sensing part" that generates a counterforce against the solenoid 3 depending on the magnitude of the suction pressure Ps.

The body 5 has ports 12, 14, and 16 formed in this order from a top end thereof. The port 12 functions as a "suction chamber communication port" communicating with the suction chamber of the compressor. The port 14 functions as a "control chamber communication port" communicating with the control chamber of the compressor. The port 16 functions as a "discharge chamber communication port" communicating with the discharge chamber of the compressor. An end member 13 is fixed to the body 5 in such a manner as to close an upper end opening of the body 5. A lower end part of the body 5 is press-fitted in an upper end part of the solenoid such that the valve unit 2 and the solenoid 3 are fixed to each other.

Inside the body 5, a main passage through which the port 16 and the port 14 communicate with each other and a sub-passage through which the port 14 and the port 12 communicate with each other are formed. The main passage functions as a "first passage," and the sub-passage functions as a "second passage." The main valve 7 is provided in the main passage while the sub-valve 8 is provided in the sub-passage. Thus, the control valve 1 has a structure in which the power element 6, the sub-valve 8, the main valve 7, and the solenoid 3 are arranged in this order from one end thereof. In the main passage, a main valve hole 20 and a main valve seat 22 are provided. In the sub-passage, a sub-valve hole 32 and a sub-valve seat 34 are provided. The main valve hole 20 functions as a "first valve hole," and the sub-valve hole 32 functions as a "second valve hole."

The port 12 allows a working chamber 23 defined (formed) in an upper part of body 5 and the suction chamber to communicate with each other. The power element 6 is disposed in the working chamber 23. The port 16 allows refrigerant at a discharge pressure Pd to be introduced from the discharge chamber. A valve chamber 24 is formed between the port 16 and the main valve hole 20. The main valve seat 22 is located at a lower end opening of the main valve hole 20. Refrigerant whose pressure is changed to a control pressure Pc through the main valve 7 is delivered toward the control chamber through the port 14 during steady operation of the compressor, while refrigerant at the control pressure Pc discharged from the control chamber is introduced through the port 14 at the startup of the compressor. Refrigerant whose pressure is changed to the suction pressure Ps through the sub-valve 8 is delivered toward the suction chamber through the port 12 at the startup of the compressor.

Cylindrical filter members 15 and 17 are mounted on the ports 14 and 16, respectively. The filter members 15 and 17 each have a mesh for preventing or reducing entry of foreign materials into the body. The filter member 17 restricts entry of foreign materials into to the port 16 while the main valve 7 is open, and the filter member 15 restricts entry of foreign materials into the port 14 while the sub-valve 8 is open.

The sub-valve hole 32 is formed between the port 14 and the working chamber 23. The sub-valve seat 34 is located at an upper end opening of the sub-valve hole 32. The sub-valve hole 32 coaxially communicates with the main valve hole 20. A guiding passage 26 is formed in a lower part (the part opposite to the main valve hole 20 with respect to the valve chamber 24) of the body 5. A stepped cylindrical valve drive member 29 is slidably inserted in the guiding passage 26.

The valve drive member 29 has an upper half part being reduced in diameter, extending through the main valve hole 20 and the sub-valve hole 32, and constituting a partition part 33 that separates the inside from the outside of the valve drive member 29. A stepped portion formed at a middle part of the valve drive member 29 constitutes a main valve element 30. The main valve element 30 touches and leaves the main valve seat 22 from the side of the valve chamber 24 to close and open the main valve 7 and thus control the flow rate of the refrigerant flowing from the discharge chamber to the control chamber. A sub-valve element 36 is formed integrally with an upper end of the valve drive member 29.

The sub-valve element 36 has a ring shape and is coaxially press-fitted into an upper end of the partition part 33. The sub-valve element 36 is located in the working chamber 23 and opposed to the sub-valve seat 34 along the axial direction. The sub-valve element 36 touches and leaves the sub-valve seat 34 to close and open the sub-valve 8. The main valve element 30 functions as a "first valve element," and the sub-valve element 36 functions as a "second valve element." Note that the main valve element 30 and the sub-valve element 36 have spool portions that are inserted into and extracted from the main valve hole 20 and the sub-valve hole 32, respectively, so that the control valve 1 achieves predetermined control characteristics. The structure and operation of the spool portions will be described in detail below.

The upper end of the valve drive member 29 is operably connected with the power element 6 via the sub-valve element 36. A lower end of the valve drive member 29 is connected with a shaft 38 (functioning as an "actuating rod") extending from the solenoid 3. A recessed fitting hole 37 is formed at the center of a lower end of the valve drive member 29, and an upper end part of the shaft 38 is press-fitted into the recessed fitting hole 37.

A working chamber 28 is formed between the body 5 and the solenoid 3. A communication hole 39 connecting an internal passage 35 of the valve drive member 29 with the working chamber 28 is formed in a side face of a lower part of the valve drive member 29. The working chamber 28 communicates with the working chamber 23 via the internal passage 35 of the valve drive member 29. Thus, the suction pressure Ps in the working chamber 23 is introduced into the working chamber 28. The suction pressure Ps is also introduced into the solenoid 3. A spring support 40 protruding radially outward is formed at a lower end portion of the valve drive member 29. A spring 42 (functioning as a "biasing member") that biases the valve drive member 29 in the opening direction of the main valve 7 and the closing direction of the sub-valve 8 is mounted between the body 5 and the spring support 40. The spring 42 functions as a so-called off-spring that fully opens the main valve 7 while the solenoid 3 is powered off.

The power element 6 includes a bellows 45, which senses the suction pressure Ps and is displaced thereby. The displacement of the bellows 45 generates a counterforce against the solenoid force. The counterforce is transmitted to the main valve element 30 and the sub-valve element 36. When the sub-valve element 36 touches the sub-valve seat 34 to close the sub-valve 8, the release of refrigerant from the control chamber to the suction chamber is blocked or restricted. When the sub-valve element 36 leaves the sub-valve seat 34 to open the sub-valve 8, the release of refrigerant from the control chamber to the suction chamber is facilitated.

The solenoid 3 includes a stepped cylindrical core 46, a bottomed cylindrical sleeve 48 mounted in such a manner as to seal off a lower end opening of the core 46, a stepped cylindrical plunger 50 contained in the sleeve 48 and disposed opposite to the core 46 along the axial direction, a cylindrical bobbin 52 mounted (outserted) around the core 46 and the sleeve 48, an electromagnetic coil 54 wound around the bobbin 52 and configured to generate a magnetic circuit when power is supplied thereto, a cylindrical casing 56 provided in such a manner as to cover the electromagnetic coil 54 from outside, an end member 58 provided in such a manner as to seal off a lower end opening of the casing 56, and a collar 60 made of a magnetic material embedded in the end member 58 at a position below the bobbin 52.

The valve unit 2 and the solenoid 3 are secured in such a manner that the lower end part of the body 5 is press-fitted into an upper end opening of the core 46. The working chamber 28 is formed between the core 46 and the body 5. The shaft 38 extends through the center of the core 46 in the axial direction. A lower end part of the shaft 38 is press-fitted into an upper half part of the plunger 50. The suction pressure Ps of the working chamber 28 is also introduced into the sleeve 48 via a communication passage 62 formed by a spacing between the shaft 38 and the core 46.

A spring 44 (functioning as a "biasing member") that biases the plunger 50, and thus the valve drive member 29, in the closing direction of the main valve 7 and the opening direction of the sub-valve 8 is disposed between a bottom of the sleeve 48 and the plunger 50. The shaft 38 is coaxially connected with the valve drive member 29 and with the plunger 50.

The shaft 38 transmits the solenoid force, which is a suction force generated between the core 46 and the plunger 50, to the valve drive member 29. At the same time, a drive force (also referred to as a "pressure-sensing drive force") generated by extraction/contraction movement of the power element 6 is exerted on the valve drive member 29 against the solenoid force. Thus, while the main valve 7 is controlled, a force adjusted by the solenoid force and the pressure-sensing drive force acts on the main valve element 30 to appropriately control the opening degree of the main valve 7. At the startup of the compressor, the shaft 38 is displaced upward depending on the magnitude of the solenoid force, to lift up the sub-valve element 36 and fully open the sub-valve 8. In this manner, the bleeding function is provided.

The sleeve 48 is made of a nonmagnetic material. A communicating groove 66 is formed in parallel with the axis on a lateral surface of the plunger 50, and a communicating hole 68 connecting the inside and the outside of the plunger 50 is provided in a lower portion of the plunger 50. Such a structure enables the suction pressure Ps to be introduced into a back pressure chamber 70 through a spacing between the plunger 50 and the sleeve 48.

A pair of connection terminals 72 connected to the electromagnetic coil 54 extend from the bobbin 52, and are led outside through the end member 58. For convenience of explanation, FIG. 1 shows only one of the pair of connection terminals 72. The end member 58 is mounted in such a manner as to cover the entire structure inside the solenoid 3 contained in the casing 56 from below. The end member 58 is formed by molding (injection molding) a corrosion-resistant plastic material, and the plastic material is also present in a spacing between the casing 56 and the electromagnetic coil 54. This allows heat generated by the electromagnetic coil 54 to be easily conducted to the casing 56, which increases the heat release performance. Ends of the connection terminals 72 are led out from the end member 58 and connected to a not-shown external power supply.

Figure 2:
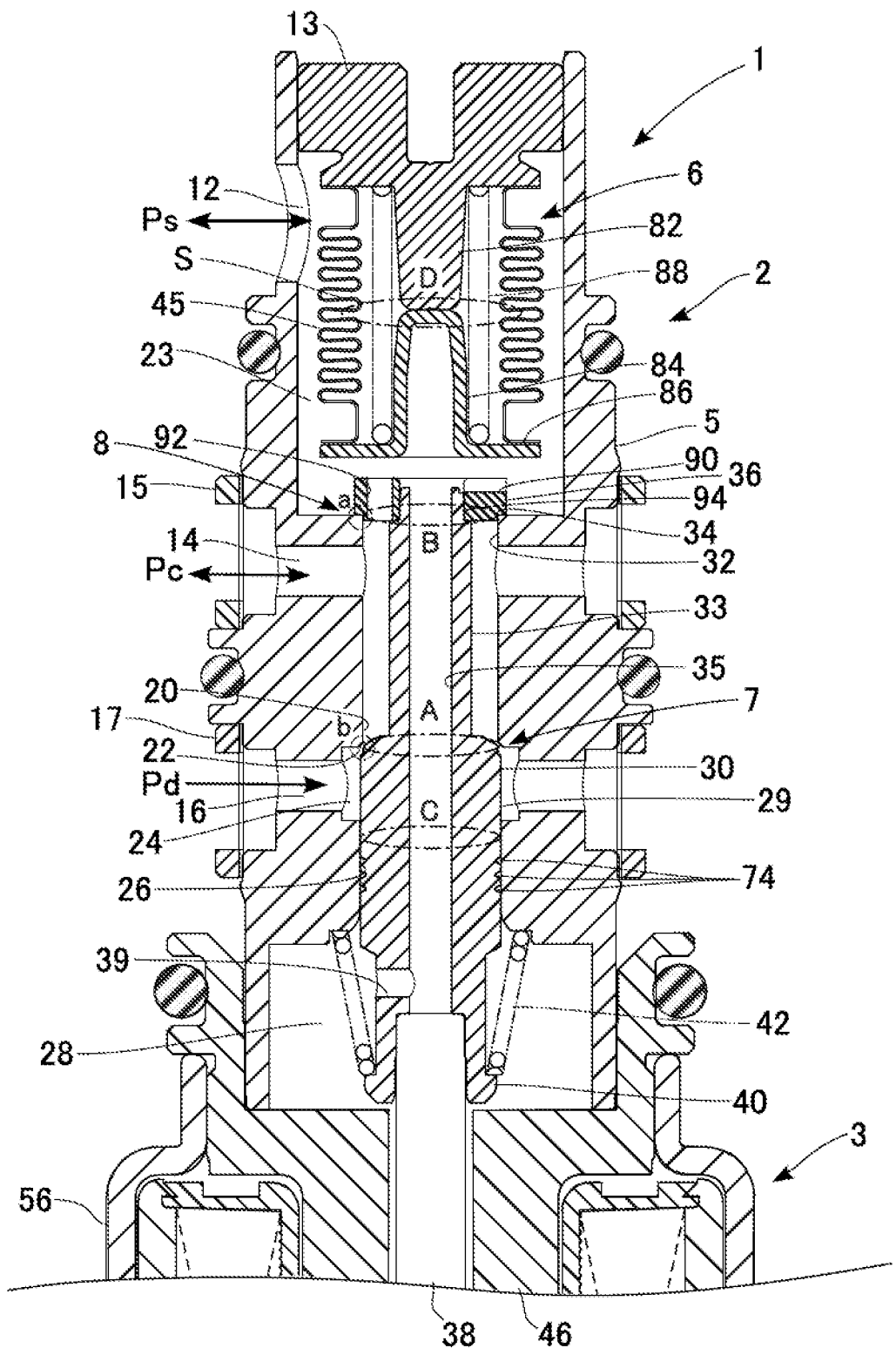
FIG. 2 is a partially enlarged cross-sectional view of the upper half of FIG. 1.

FIG. 2 is a partially enlarged cross-sectional view of the upper half of FIG. 1.

A labyrinth seal 74 having a plurality of annular grooves for restricting passage of refrigerant is formed on a sliding surface of the valve drive member 29 sliding relative to the guiding passage 26. The shaft 38 is formed integrally with the valve drive member 29, which allows the solenoid force to be directly transmitted to the main valve element 30 and the sub-valve element 36. This structure functions as a lock release mechanism for releasing a locked state where operation of each of the valve elements is locked owing to a foreign material stuck between the valve drive member 29 and the guiding passage 26 sliding relative to each other.

The power element 6 includes a first stopper 82 closing an upper end opening of the bellows 45 and a second stopper 84 closing a lower end opening thereof. The bellows 45 functions as a "pressure sensing member," and the first stopper 82 and the second stopper 84 function as "base members". The first stopper 82 is integrally formed with the end member 13. The second stopper 84 is formed into a bottomed cylindrical shape by press forming a metal material and has a flange portion 86 extending radially outward from a lower end opening thereof. The bellows 45 has a bellows body. An upper end part of the body is welded to an lower face of the end member 13 in an airtight manner, and a lower end opening of the body is welded to an upper face of the flange portion 86 in an airtight manner. The inside of the bellows 45 is a hermetically-sealed reference pressure chamber S. A spring 88 for biasing the bellows 45 in an expanding (stretching) direction is disposed between the end member 13 and the flange portion 86 on an inner side of the bellows 45. The reference pressure chamber S is in a vacuum state in the present embodiment.

The end member 13 is a fixed end of the power element 6. The amount by which the end member 13 is press-fitted into the body 5 can be adjusted, so that a set load of the power element 6 (a set load of the spring 88) can be adjusted. A middle part of the first stopper 82 extends downward and inward of the bellows 45, and a middle part of the second stopper 84 extends upward and inward of the bellows 45, which form an axial core of the bellows 45. The bellows 45 expands (stretches) or contracts in the axial direction (in the opening/closing direction of the main valve and the sub-valve) according to a pressure difference between the suction pressure Ps in the working chamber 23 and a reference pressure in the reference pressure chamber S. As the pressure difference becomes smaller and the bellows 45 expands, a drive force in the opening direction of the main valve 7 and the closing direction of the sub-valve 8 is applied on the valve drive member 29. Even when the pressure difference becomes large, the second stopper 84 comes into contact with the first stopper 82 and is stopped thereby at the point where the bellows 45 has contracted by a predetermined amount, and the contraction is thus restricted.

The sub-valve element 36 has a ring-shaped body. An upper face of the sub-valve element 36 is cut out at a predetermined position in the circumferential direction, which forms a communication passage 90. In addition, a communication passage 92 extending through the body in parallel with the axis is formed at another position in the circumferential direction. An end of the valve drive member 29 is slightly reduced in diameter to form a diameter-reduced portion 94. The sub-valve element 36 is press-fitted around the diameter-reduced portion 94. The sub-valve element 36 has a height slightly larger than that of the diameter-reduced portion 94. With this structure, as illustrated in FIG. 1, when the power element 6 expands, an upper surface of the sub-valve element 36 comes in contact with a lower surface of the flange portion 86, which closes an upper end of the communication passage 92. In contrast, the communication passage 90 is always open in the radial direction. Thus, the suction pressure Ps in the working chamber 23 is constantly introduced into the working chamber 28, and thus the solenoid 3, through the communication passage 90 and the internal passage 35 of the valve drive member 29.

In the present embodiment, an effective pressure receiving diameter A (sealing diameter) of the main valve element 30 in the main valve 7, an effective pressure receiving diameter B (sealing diameter) of the sub-valve element 36 in the sub-valve 8, and a sliding portion diameter C (sealing diameter) of the valve drive member 29 are set to be equal. The term "equal" used herein may include not only a concept of being exactly equal but also a concept of almost equal (substantially equal). Thus, the influences of the discharge pressure Pd, the control pressure Pc, and the suction pressure Ps acting on a combined unit of the main valve element 30 and the sub-valve element 36 (that is, a combined unit of the valve drive member 29 and the sub-valve element 36) connected with each other are cancelled. As a result, while the main valve 7 is controlled, the main valve element 30 performs the valve opening or closing operation on the basis of the suction pressure Ps received by the power element 6 in the working chamber 23. That is, the control valve 1 functions as a so-called Ps sensing valve.

In the present embodiment, the influences of the pressures (Pd, Pc, and Ps) acting on the valve elements (the main valve element 30 and the sub-valve element 36) can be cancelled by setting the diameters A, B, and C to be equal to one another and making the internal passage pass through the valve elements vertically. Specifically, the pressures before and after (above and below in FIG. 2) a combined unit of the sub-valve element 36, the valve drive member 29, the shaft 38, and the plunger 50 connected with one another can be set to an equal pressure (the suction pressure Ps), which achieves pressure cancellation. As a result, the diameters of the valve elements can be set independent of the effective pressure receiving diameter D of the bellows 45, which achieves high design flexibility. While the diameter D of the bellows 45 is set to be larger than the diameters A, B, and C, the diameter D may alternatively be equal to or smaller than the diameters A, B, and C.

Next, operation of the control valve will be described.

In the present embodiment, the pulse width modulation (PWM) is employed for controlling power supply to the solenoid 3. The PWM control is control based on a supplied pulsed current with a frequency of about 400 Hz set at a predetermined duty ratio, which is performed by a control unit (not illustrated). The control unit includes a PWM output unit to output a pulse signal with a specified duty ratio. Since a known configuration is used for the PWM unit, detailed description thereof is omitted.

Figure 3:
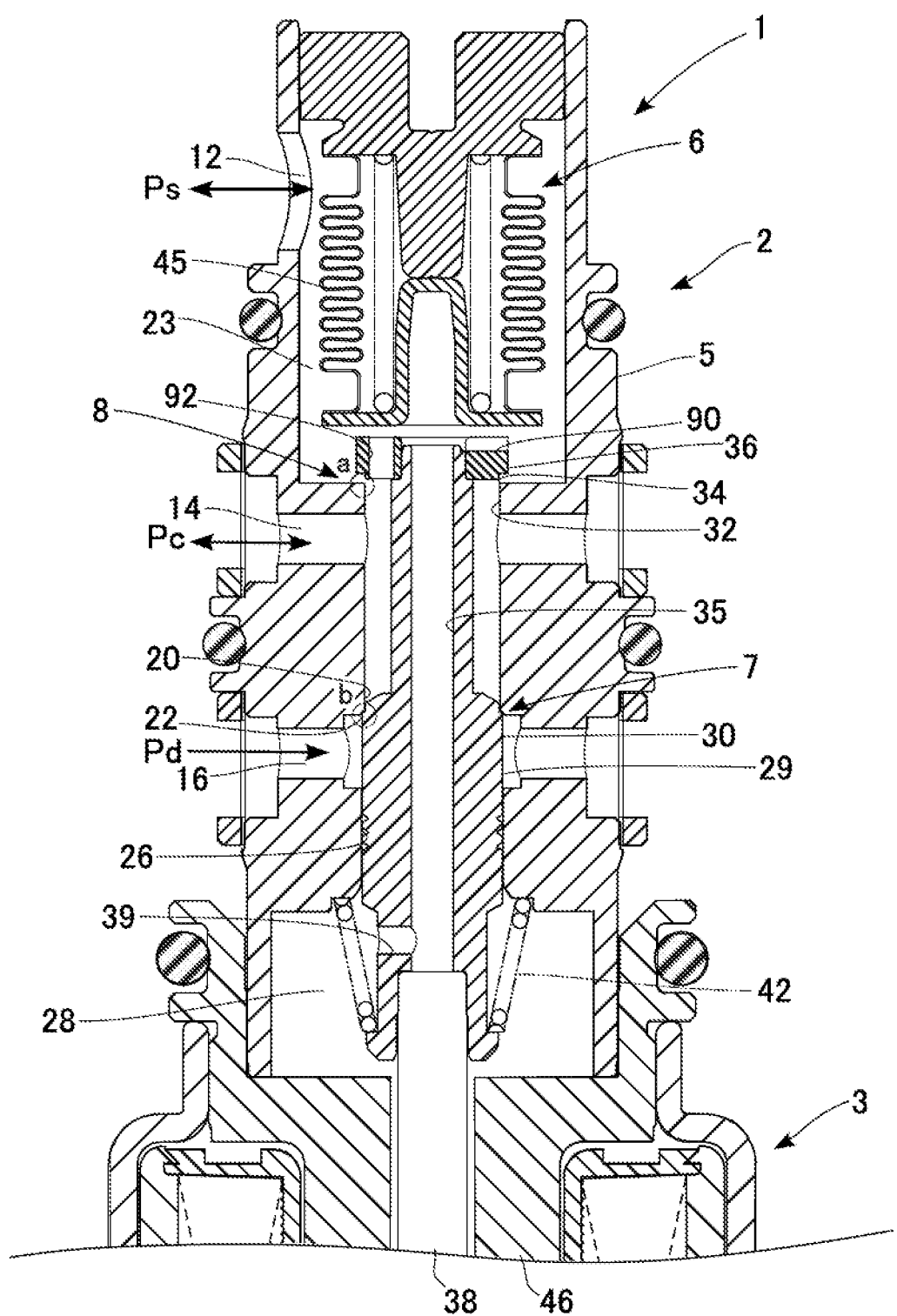
FIG. 3 illustrates operation of the control valve.

FIG. 3 illustrates operation of the control valve. FIG. 2, mentioned above, illustrates a state of the control valve during minimum capacity operation. FIG. 3 illustrates a state in which the bleeding function is being carried out during maximum capacity operation (such as at the startup of the air conditioner). Hereinafter, description will be provided on the basis of FIG. 1 and with reference to FIGS. 2 and 3 where necessary.

In the control valve 1, while the solenoid 3 is powered off, that is, while the air conditioner is not in operation, the suction force does not act between the core 46 and the plunger 50. In the meantime, the valve drive member 29 is pressed downward by the spring 42. As a result, the main valve element 30 moves away from the main valve seat 22 and the main valve 7 becomes fully open. At this point, the sub-valve element 36 touches the sub-valve seat 34 and the sub-valve 8 becomes fully closed as illustrated in FIG. 1. When, however, the suction pressure Ps increases thereafter, the bellows 45 contracts, which opens the communication passage 92 as illustrated in FIG. 2. Thus, while the solenoid is powered off, the flow itself in the refrigeration cycle is small. In addition, even though the pressure difference (Pc−Ps) between the control pressure Pc and the suction pressure Ps becomes smaller, appropriate bleeding through the communication passage 92 is carried out, which allows a minimum required amount of internal circulation to be provided. Furthermore, the control pressure Pc is prevented from becoming excessively high. The power element 6 and the sub-valve element 36 constitute an "opening/closing mechanism" that opens and closes the communication passage 92 depending on the magnitude of the suction pressure Ps. A pressure sensing member (including the bellows 45 and the second stopper 84) of the power element 6 and the sub-valve element 36 can be operably connected with or disconnected from each other, so that the communication passage 92 is closed or opened. Note that the communication passage 92 having an appropriate size can eliminate the need for a fixed orifice, which is typically provided in a housing of a compressor.

In contrast, when control current (starting current) is supplied to the solenoid 3, such as at the startup of the air conditioner, the core 46 sucks (pulls) the plunger 50. This lifts up the shaft 38 and thus the valve drive member 29. As a result, as illustrated in FIG. 3, the main valve element 30 touches the main valve seat 22 to close the main valve 7, and the sub-valve element 36 moves away from the sub-valve seat 34 to fully open the sub-valve 8. This facilitates release of refrigerant at a predetermined flow rate from the control chamber to the suction chamber, which lowers the control pressure Pc. The compressor thus performs the maximum capacity operation. In other words, the bleeding function is carried out and the compressor is quickly started. When the suction pressure Ps is relatively high at the startup of the air conditioner, the bellows 45 contracts as illustrated in FIG. 3, which opens the communication passage 92. This, in combination with the fully-open state of the sub-valve 8, further facilitates release of the refrigerant. As a result, the startup performance of the compressor is further improved. In particular, when the compressor is started from a state in which liquid refrigerant is collected in the control chamber (crankcase), evaporation of the liquid refrigerant increases the control pressure, and the bleeding efficiency thus tends to lower. In this regard, the structure in which the release of refrigerant from the control chamber is synergistically increased as in the present embodiment is advantageous in improving the startup performance. When the suction pressure Ps lowers, the bellows 45 expands to close the communication passage 92, which operably connects the power element 6 with the valve elements.

As described above, the opening/closing mechanism constituted by the power element 6 and the sub-valve element 36 opens the communication passage 92 both during the minimum capacity operation and during the maximum capacity operation of the air conditioner. This provides sufficient internal circulation of the refrigerant during the minimum capacity operation and also facilitates the bleeding function during the maximum capacity operation. In other words, a specific passage (hole) formed in the sub-valve element 36 can provide the bleeding performance in both of different operation conditions. In addition, the opening/closing mechanism closes the communication passage 92 during variable capacity operation. This minimizes the internal circulation amount and improves the power of the air conditioner. While an example in which one communication passage 92 is formed in the sub-valve 92 is presented in the present embodiment, a plurality of communication passages may be formed. In addition, while an example in which the communication passage 92 is formed in the sub-valve element 36 in the present embodiment, the communication passage may be formed in another movable member in the body 5, that is, the valve drive member, the shaft (actuating rod), or the like in a modification.

When the current supplied to the solenoid 3 is within a control current range for the main valve 7, the opening degree of the main valve 7 is autonomously regulated so that the suction pressure Ps becomes a preset pressure $P_{set}$ set depending on the amount of current supplied to the solenoid 3. In this control state of the main valve 7, the sub-valve 8 is maintained at a small opening degree. In this state, since the suction pressure Ps is relatively low, the bellows 45 is expanded, and the main valve element 30 is operably connected with the power element 6 and regulates the opening degree of the main valve 7. In this process, the main valve element 30 stops at a valve lifted position where the force in the valve opening direction generated by a net force of the springs 42 and 44, the force in the valve closing direction from the solenoid, and the force in the valve opening direction generated by the power element 6 depending on the suction pressure Ps are balanced.

When the refrigeration load is increased and the suction pressure Ps becomes higher than the preset pressure $P_{set}$, for example, the bellows 45 contracts, and the main valve element 30 is thus displaced relatively upward (in the valve closing direction). As a result, the valve opening degree of the main valve 7 becomes smaller, and the compressor operates to increase the discharging capacity. Consequently, the suction pressure Ps changes in the lowering direction. Conversely, when the refrigeration load becomes smaller and the suction pressure Ps becomes lower than the preset pressure $P_{set}$, the bellows 45 expands. As a result, the power element 6 biases the main valve element 30 in the valve opening direction, increasing the valve opening degree of the main valve 7, and the compressor operates to reduce the discharging capacity. Consequently, the suction pressure Ps is kept at the preset pressure $P_{set}$.

When the engine load is increased while such steady control is performed and the load on the air conditioner is to be reduced, the solenoid 3 of the control valve 1 is switched off from the on state. Since the suction force then does not act between the core 46 and the plunger 50, the main valve element 30 is separated from the main valve seat 22 by the biasing force of the spring 42 and the main valve becomes in the fully open state. In this process, since the sub-valve element 36 is seated on the sub-valve seat 34, the sub-valve 8 becomes in the valve closed state. As a result, refrigerant at the discharge pressure Pd introduced from the discharge chamber of the compressor through the port 16 passes through the fully open main valve 7 and flows through the port 14 to the control chamber. Thus, the control pressure Pc becomes higher and the compressor operates with a minimum capacity. When the suction pressure Ps increases as described above, however, the bellows 45 contracts to open the communication passage 92, and appropriate bleeding is carried out.

Next, the structures and operation of the valve elements will be described in detail.

FIGS. 4A to 4E are partially enlarged cross-sectional views illustrating the structures and operations of the main valve element and the sub-valve element. FIGS. 4A to 4E illustrate processes of the operations from the fully-open state to the fully-closed state of the main valve. The lower drawings of FIGS. 4A to 4E illustrate the states of the main valve, and the upper drawings thereof illustrate the states of the sub-valve in the corresponding processes. The upper drawing of FIG. 4A is an enlarged view of part a in FIG. 2, and the lower drawing thereof is an enlarged view of part b in FIG. 2. The upper drawing of FIG. 4E is an enlarged view of part a in FIG. 3, and the lower drawing thereof is an enlarged view of part b in FIG. 3.

As illustrated in the lower drawing of FIG. 4A, the main valve element 30 has a stepped shape. A base end of the stepped part constitutes a touching/leaving portion 100, and a spool portion 102 (functioning as a "first spool portion") is formed continuously with and upward from the touching/leaving portion 100. The touching/leaving portion 100 touches and leaves the main valve seat 22 to close and open the main valve 7. The spool portion 102 is inserted into and removed from the main valve hole 20.

As illustrated in the upper drawing of FIG. 4A, a lower end part of the sub-valve element 36 has a stepped shape. A base end of the stepped part constitutes a touching/leaving portion 110, and a spool portion 112 (functioning as a "second spool portion") is formed continuously with and downward from the touching/leaving portion 110. The touching/leaving portion 110 touches and leaves the sub-valve seat 34 to close and open the sub-valve 8. The spool portion 112 has a tapered shape with the outer diameter decreasing toward a leading end thereof (downward), and is inserted into and removed from the sub-valve hole 32.

In this structure, while the solenoid 3 is powered off, the main valve 7 is fully open and the sub-valve 8 is fully closed as illustrated in FIG. 4A. When power is supplied to the solenoid 3, the main valve 7 operates in the valve closing direction, and the sub-valve 8 operates in the valve opening direction. As the current supplied to the solenoid 3 increases, the sub-valve 8 first starts to open. In this process, until the spool portion 112 is removed from the sub-valve hole 32, an orifice is formed between the sub-valve element 36 and the sub-valve hole 32, and the flow of the refrigerant through the sub-valve 8 is permitted but limited to a small rate (FIGS.

4A and 4B). Since, however, the spool portion 112 has a tapered shape, the orifice becomes gradually larger as the sub-valve element 36 is displaced, and the flow rate through the orifice gradually increases. The opening degree of the main valve 7 becomes gradually smaller.

When the spool portion 112 is removed from the sub-valve hole 32, the increase rate of the opening degree of the sub-valve 8 becomes larger, and the refrigerant flow rate increases. This facilitates release of the refrigerant from the control chamber to the suction chamber. In the meantime, since the spool portion 102 of the main valve 7 is inserted into the main valve hole 20, an orifice is formed between the main valve element 30 and the main valve hole 20, the flow of the refrigerant through the main valve 7 is permitted but limited to a small rate (FIGS. 4C and 4D). Thereafter, when the spool portion 102 touches the main valve seat 22, the main valve 7 becomes fully closed and the sub-valve 8 becomes fully open (FIG. 4E).

Figure 5A:
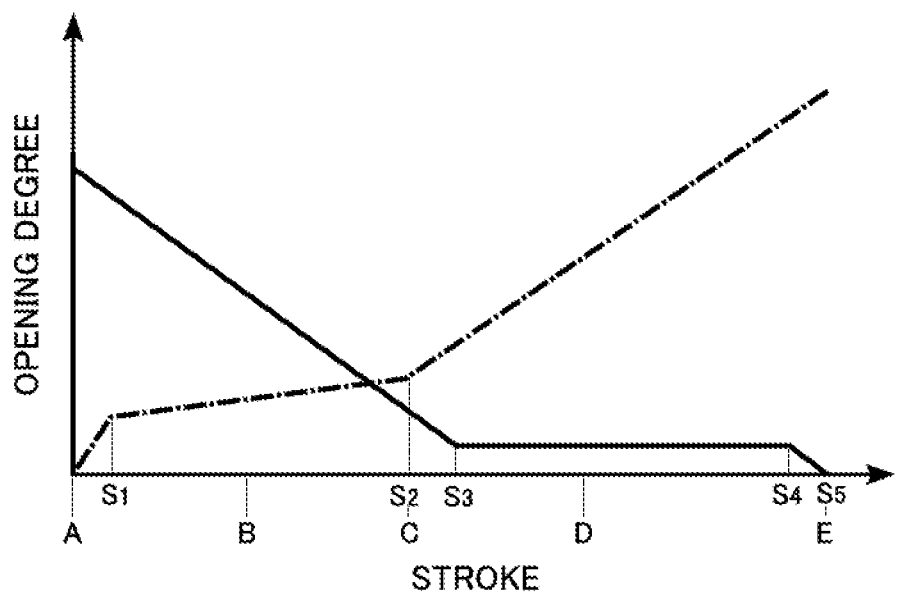
FIGS. 5A and 5B are graphs showing valve opening characteristics of a main valve and a sub-valve.
Figure 5B:
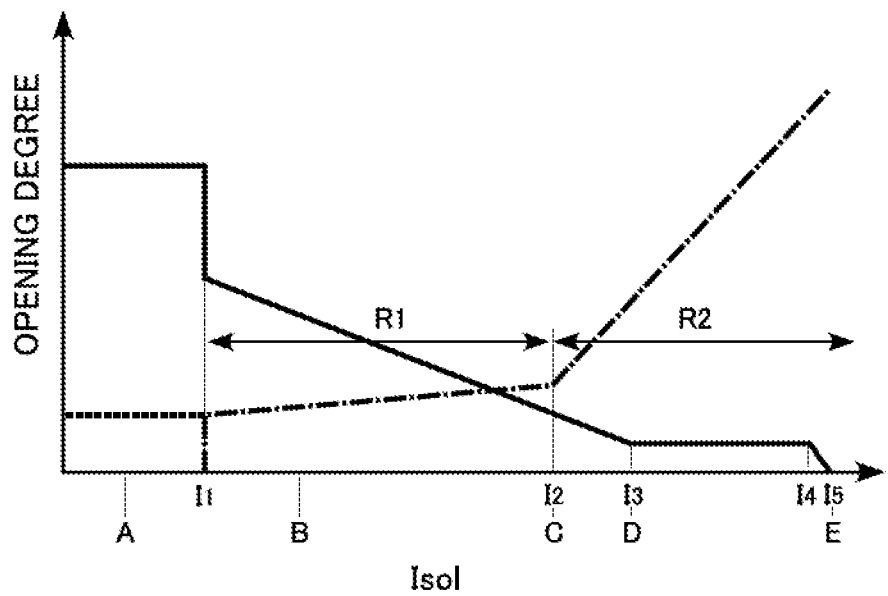

FIGS. 5A and 5B are graphs showing valve opening characteristics of the main valve and the sub-valve. FIG. 5A shows the relation between the strokes of the valve elements and the valve opening degrees (opening areas of the valve sections). In FIG. 5A, the horizontal axis represents the stroke of the main valve in the valve closing direction relative to the fully-open position of the main valve, and the vertical axis represents the valve opening degree. In FIG. 5A, a solid line represents the main valve, and an alternate long and short dashed line represents the sub-valve. FIG. 5B shows the relation between the amount of current supplied to the solenoid and the valve opening degrees. In FIG. 5B, the horizontal axis represents the amount of current supplied to the solenoid, and the vertical axis represents the valve opening degree. In FIG. 5B, a solid line represents the main valve, and an alternate long and short dashed line represents the sub-valve. For convenience of explanation, A to E are shown in FIGS. 5A and 5B to show correspondence with the operation processes of FIGS. 4A to 4E.

The operations of the valves illustrated in FIGS. 4A to 4E appear as the control characteristics shown in FIGS. 5A and 5B. Specifically, while the amount of current supplied to the solenoid 3 is in a range from zero to $I_1$ (corresponding to a "lower limit current value"), the stroke is zero, the main valve 7 is fully open, and the sub-valve 8 is fully closed. Since, however, the suction pressure Ps becomes relatively high, the communication passage 92 in the sub-valve element 36 is opened. The flow of the refrigerant is thus permitted through the communication passage 92, which functions as an orifice (a range shown by a dotted line in FIG. 5B).

When the amount of supplied current exceeds the lower limit current value $I_1$, the main valve 7 starts to close, and the sub-valve 8 starts to open. In this process, as the stroke becomes larger with the increase in the amount of supplied current, the opening degree of the main valve 7 becomes proportionally smaller. In the meantime, the opening degree of the sub-valve 8 quickly and slightly increases until the stroke reaches $S_1$, and then slowly increases until the amount of supplied current reaches $I_2$ and the stroke reaches $S_2$. This means that the valve opening degree of the sub-valve 8 rises at the start of valve opening because the sub-valve 8 is a flat valve, but slowly increases thereafter while the opening degree is suppressed by the orifice having the tapered shape. In the present embodiment, the opening degree of the sub-valve 8 becomes larger than that of the main valve 7 before the stroke reaches $S_2$ as described above.

When the stroke exceeds $S_2$, the spool portion 112 is removed from the sub-valve hole 32 as described above, which eliminates the effect of the orifice of the sub-valve 8. As a result, the increase rate of the opening degree becomes larger causing the sub-valve 8 to operate toward the fully open state. This provides the bleeding function. In the meantime, the opening degree of the main valve 7 proportionally decreases until the amount of supplied current reaches $I_3$ and the stroke reaches $S_3$. When the stroke exceeds $S_3$, the spool portion 102 is inserted into the main valve hole 20 as described above, which provides the effect of the orifice of the main valve 7. When the amount of supplied current exceeds $I_4$ and the stroke exceeds $S_4$, the main valve 7 operates toward the fully closed state. Thus, the main valve 7 is fully closed while the amount of supplied current is in a range from $I_5$ to the upper limit current value.

The control characteristics include a first control range R1 in which the opening degree of the sub-valve 8 increases with the increase in the amount of current supplied to the solenoid 3, and a second control range R2 in which the amount of supplied current is larger than that in the first control range R1 and the valve opening degree of the sub-valve 8 increases further than that in the first control range R1. The increase rate of the valve opening degree in the first control range R1 is smaller than that in the second control range R2.

As described above, in the present embodiment, since a state in which both of the main valve 7 and the sub-valve 8 are open at the same time is included in the control characteristics, regulation of the valve opening degrees of the main valve 7 and the sub-valve 8 allows the internal circulation amount of the refrigerant in the compressor to be small and increases the power of the air conditioner. The main valve element 30 and the sub-valve element 36 each have a spool portion, which allows the valve open states of the main valve 7 and the sub-valve 8 to be switched smoothly when the current supplied to the solenoid 3 is changed as shown in FIG. 5B. Specifically, the sub-valve 8 is efficiently opened at closing timing of the main valve element 30 without stagnation (dead zone) of the valve opening operation of the sub-valve element 36. In addition, the spool portion of the sub-valve element 36 has an inclined shape such that a clearance between the spool portion and the sub-valve hole 32 is increased toward the valve closing direction of the sub-valve 8, which allows the efficiency of opening the sub-valve 8 in response to the current supplied to the solenoid 3 to be switched in a stepwise manner as shown in FIGS. 5A and 5B. Thus, the control is smoothly continued such that the opening degree of the sub-valve 8 is gradually increased in the control range of the main valve 7 in which the amount of supplied current is relatively small and the sub-valve 8 is then switched to the fully open state beyond the control range of the main valve 7. Furthermore, the increase in the opening degree of the sub-valve 8 in this manner can facilitate suppressing of an increase in the control pressure Pc due to the blow-by gas, for example, and thus stabilize the capacity control.

When the operation is switched to the minimum capacity operation, the amount of current supplied to the solenoid 3 is set to the lower limit current value $I_1$ (an inflection point) or lower, which allows the main valve 7 to be quickly brought to the fully open state and allows this switching in the operation to be quickly carried out. Thus, the present embodiment allows the operation of the compressor to be maintained at high efficiency and allows efficient switching of the operation.

Furthermore, the opening/closing mechanism capable of increasing the bleeding both during the maximum capacity operation and during the minimum capacity operation is provided, which provides necessary and sufficient amounts of bleeding in both of the operation conditions. As a result, sufficient internal circulation of the refrigerant during the minimum capacity operation (while the amount of external circulation should be particularly small) is provided, and the bleeding function during the maximum capacity operation (while the amount of external circulation should be particularly large) is enhanced. This structure eliminates the need for a fixed orifice, which is typically provided in the compressor, or at least can make such a fixed orifice smaller. Consequently, the external circulation during the variable capacity operation is facilitated and the power of the air conditioner is improved. This leads to reduction in the load on the engine, which is a drive source of the compressor, and improves the fuel efficiency of the vehicle. Furthermore, the use of a single opening/closing mechanism both during the maximum capacity operation and during the minimum capacity operation provides an advantage that the above-described effects are achieved with a simple structure.

Modification 1

Figure 6:
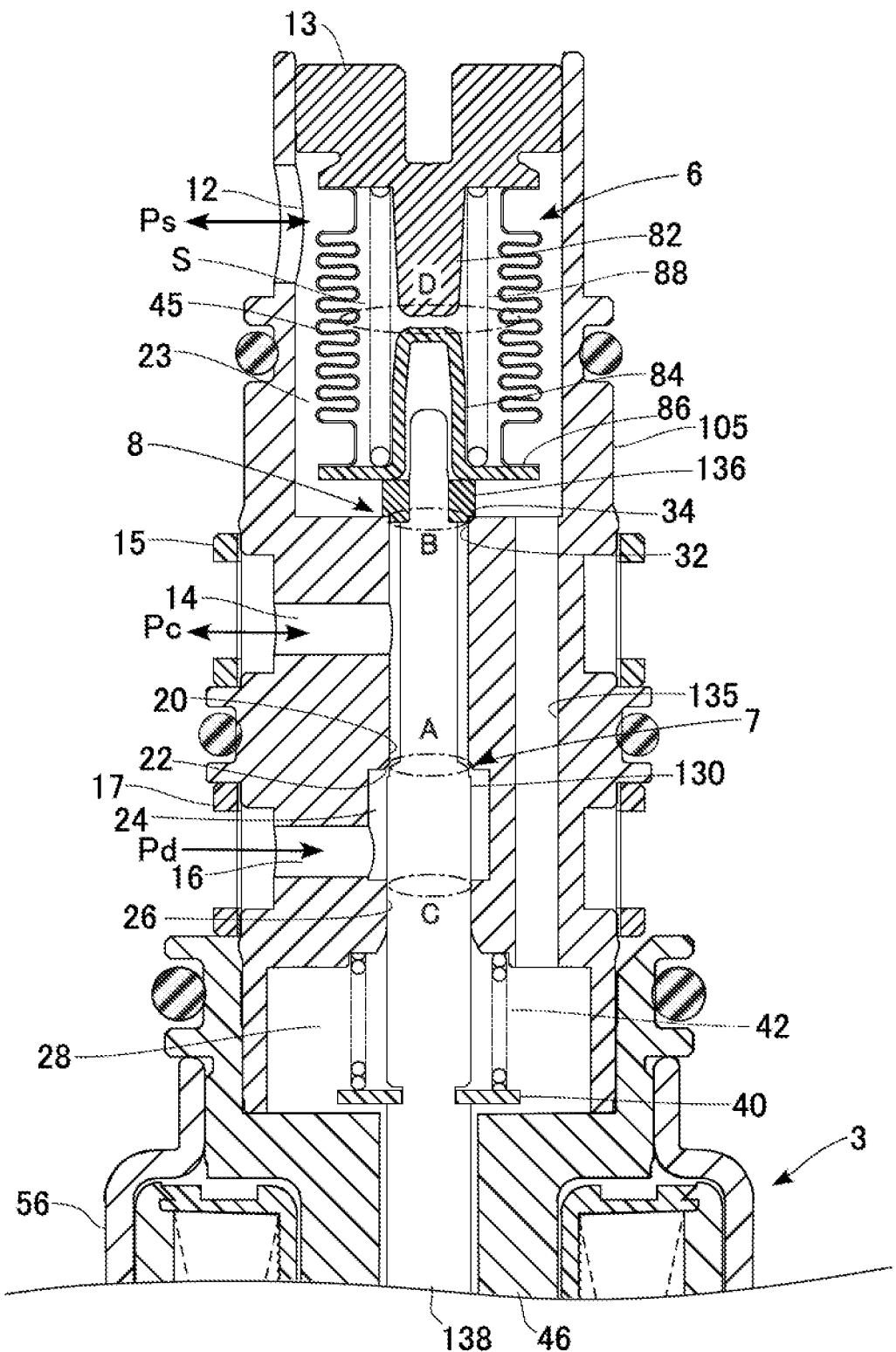
FIG. 6 is a partially enlarged cross-sectional view of an upper half of a control valve according to a modification.

FIG. 6 is a partially enlarged cross-sectional view of an upper half of a control valve according to a modification.

In this modification, a passage for supplying the suction pressure Ps into the solenoid is formed in the body instead of the valve drive member (the valve elements) as in the first embodiment.

Specifically, an elongated actuating rod 138, instead of the valve drive member 29 and the shaft 38 in the first embodiment, is inserted in a body 105. The actuating rod 138 has an upper half part having a diameter decreasing in a stepwise manner, and a leading end inserted in the second stopper 84 of the power element 6. A main valve element 130 is integrally formed with a middle part of the actuating rod 138, and a sub-valve element 136 is fixed to (press-fitted around) an upper end part of the actuating rod 138. The main valve element 130 has a touching/leaving portion and a spool portion similarly to the main valve element 30.

The sub-valve element 136 has a ring-shaped body. A lower end part of the sub-valve element body has a stepped shape. The sub-valve element 136 also has a touching/leaving portion and a spool portion at the stepped part similarly to the sub-valve element 36, the description of which is omitted here.

A communication passage 135 connecting the working chamber 23 with the working chamber 28 is formed in parallel with the axis in the body 105. Thus, the suction pressure Ps in the working chamber 23 is constantly introduced into the working chamber 28, and thus the solenoid 3, through the communication passage 135.

The present modification provides effects similar to those provided by the first embodiment. The control characteristics in the present modification are substantially the same as the control characteristics shown in FIGS. 5A and 5B, but do not include the characteristic shown by the dotted line in FIG. 5B (that is, the characteristic that the bleeding from the control chamber is carried out even while the main valve 7 is fully open). This is because no communication passage that is opened when the power element 6 contracts is not formed in the sub-valve element 136 (see the communication passage 92 in FIG. 2). Needless to say, this communication passage may also be formed in the structure of the present modification. Conversely, the communication passage 92 may be omitted from the structure of the first embodiment.

Modification 2

Figure 8A:
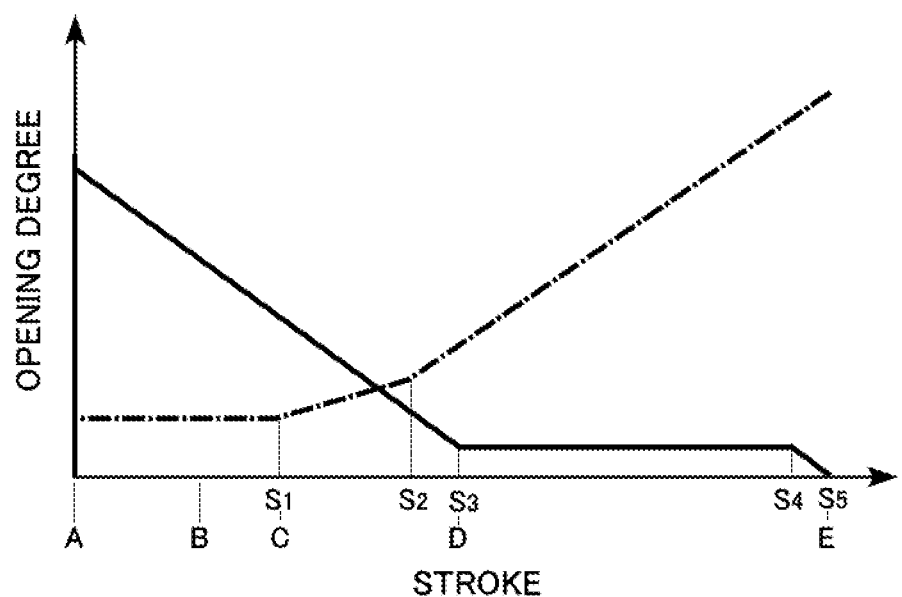
FIGS. 8A and 8B are graphs showing valve opening characteristics of a main valve and a sub-valve according to a modification.
Figure 8B:
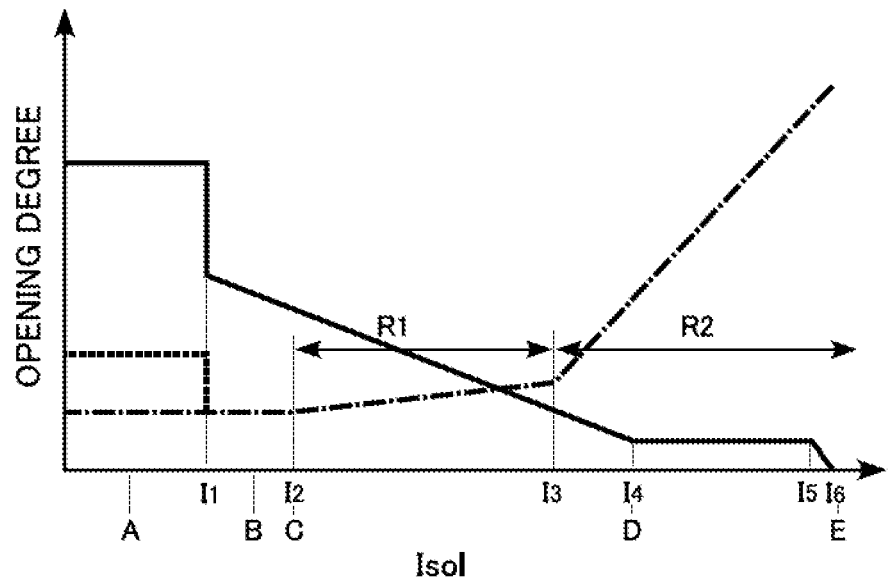

FIGS. 7A to 7E are partially enlarged cross-sectional views illustrating the structures and operations of valve elements according to a modification. FIGS. 7A to 7E correspond to FIGS. 4A to 4E in the first embodiment. The lower drawings of FIGS. 7A to 7E illustrate the states of a main valve, and the upper drawings thereof illustrate the states of a sub-valve in corresponding processes. FIGS. 8A and 8B are graphs showing valve opening characteristics of the main valve and the sub-valve according to the modification. FIGS. 8A and 8B correspond to FIGS. 5A and 5B, respectively, in the first embodiment. FIG. 8A shows the relation between the strokes of the valve elements and the valve opening degrees, and FIG. 8B shows the relation between the amount of current supplied to the solenoid and the valve opening degrees.

As illustrated in FIGS. 7A to 7E, a sub-valve element 137 of the present modification has no touching/leaving portion unlike the sub-valve element 36 in the first embodiment. A spool portion 113 has a cylindrical portion 120 parallel to the axis of the sub-valve element 137 and a tapered portion 122 having an outer diameter decreasing downward. Thus, the sub-valve element 137 performs opening/closing operation with respect to the sub-valve hole 32, but does not fully close the sub-valve 8.

With this structure, the operations of the valves illustrated in FIGS. 7A to 7E appear as the control characteristics shown in FIGS. 8A and 8B. Specifically, the characteristics of the main valve 7 are the same as those in the first embodiment. In the meantime, the characteristics of the sub-valve 8 are such that the stroke is zero while the amount of current supplied to the solenoid 3 is in a range from zero to $I_1$ (a lower limit current value), and that refrigerant flows through a clearance between the cylindrical portion 120 and sub-valve hole 32, which functions as a first orifice that permits the refrigerant to flow therethrough (an alternate long and short dashed line in FIG. 8B). In addition, since the suction pressure Ps becomes relatively high, the communication passage 92 of the sub-valve element 137 is opened. Thus, the communication passage 92 functions as a second orifice that further permits the refrigerant to flow therethrough (a range shown by a dotted line in FIG. 8B). A bleeding amount larger than that in the first embodiment is thus achieved.

When the amount of supplied current exceeds the lower limit current value $I_1$, the main valve 7 starts to close. As the stroke becomes larger with the increase in the amount of supplied current, the opening degree of the main valve 7 becomes proportionally smaller. In the meantime, the sub-valve 8 also starts to open. Until the stroke reaches $S_1$, however, since the clearance between the cylindrical portion 120 and the sub-valve hole 32 is constant, the opening degree of the sub-valve 8 does not change. When the amount of supplied current exceeds $I_2$, the opening degree of the sub-valve 8 slowly increases until the stroke reaches $S_2$ from $S_1$. When the amount of supplied current exceeds $I_3$ and the stroke exceeds $S_2$, the spool portion 113 is removed from the sub-valve hole 32, which increases the increase rate of the opening degree of the sub-valve 8. This provides the bleeding effect.

When the amount of supplied current exceeds $I_4$ and the stroke exceeds $S_3$, the spool portion 102 is inserted in the main valve hole 20, which provides the effect of the orifice of the main valve 7. When the amount of supplied current exceeds $I_5$ and the stroke exceeds $S_4$, the main valve 7 operates toward the fully closed state. Thus, the main valve 7 is fully closed while the amount of supplied current is in a range from $I_6$ to the upper limit current value. The control characteristics also include a first control range R1 and a second control range R2, and the increase rate of the valve opening degree in the first control range R1 is smaller than that in the second control range R2. The present modification supports a specification in which the sub-valve 8 has a large opening degree while the solenoid 3 is powered off.

Modification 3

Figure 10A:
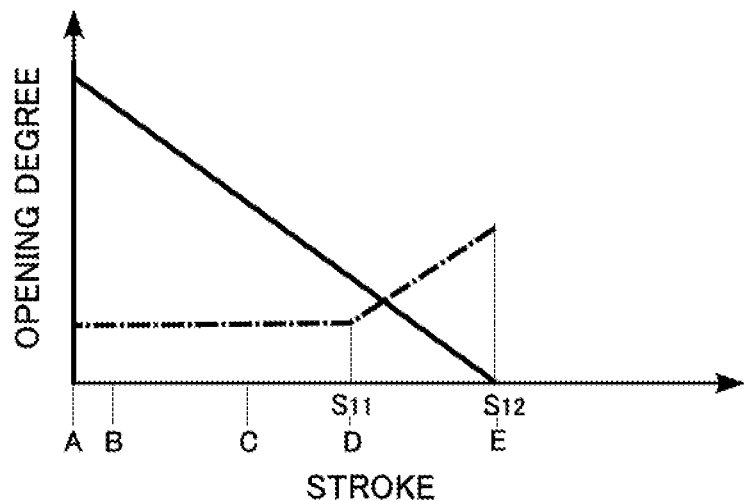
FIGS. 10A to 10C are graphs showing valve opening characteristics of a main valve and a sub-valve according to a modification.
Figure 10B:
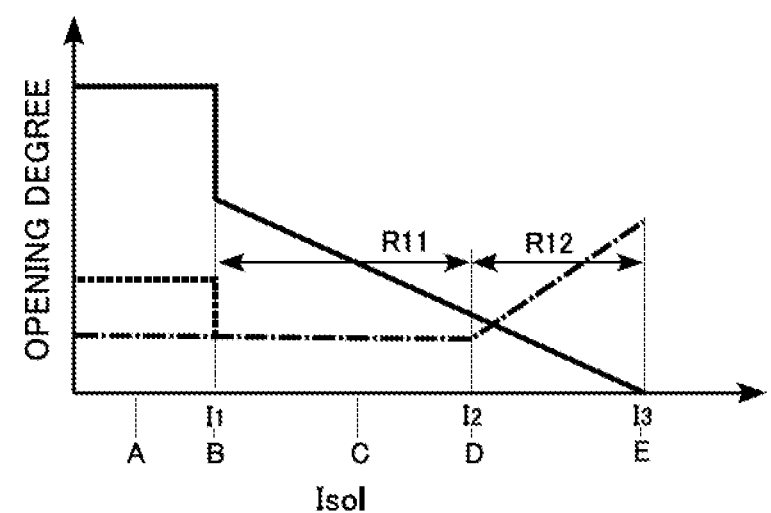
Figure 10C:
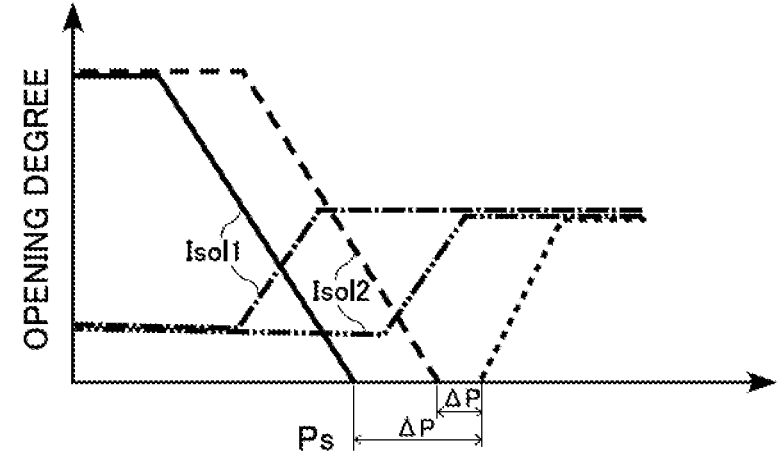

FIGS. 9A to 9E are partially enlarged cross-sectional views illustrating the structures and operations of valve elements according to another modification. The lower drawings of FIGS. 9A to 9E illustrate the states of a main valve, and the upper drawings thereof illustrate the states of a sub-valve in corresponding processes. FIGS. 10A to 10C are graphs showing valve opening characteristics of the main valve and the sub-valve according to the modification. FIG. 10A shows the relation between the strokes of the valve elements and the valve opening degrees, and FIG. 10B shows the relation between the amount of current supplied to the solenoid and the valve opening degrees. FIG. 10C shows the relation between the suction pressure Ps and the valve opening degrees.

As illustrated in FIGS. 9A to 9E, the sub-valve element 139 of the present modification has no touching/leaving portion. A spool portion 114 has a cylindrical portion 124 parallel to the axis of the sub-valve element 139, but has no tapered portion unlike the first embodiment. A main valve element 131 has no spool portion, and has an upper end portion that is a touching/leaving portion 100.

With this structure, the operations of the valves illustrated in FIGS. 9A to 9E appear as the control characteristics shown in FIGS. 10A to 10C. Specifically, while the amount of current supplied to the solenoid 3 is in a range from zero to a lower limit current value $I_1$, the stroke is zero and the main valve 7 is fully open. In contrast, the characteristics of the sub-valve 8 is such that the stroke is zero while the amount of current supplied to the solenoid 3 is in a range from zero to $I_1$, and that refrigerant flows through a clearance between the spool portion 114 and the sub-valve hole 32, which functions as a first orifice that permits the refrigerant to flow therethrough. In addition, while the suction pressure Ps is relatively high, the communication passage 92 of the sub-valve element 139 is opened. Thus, the communication passage 92 functions as a second orifice that further permits the refrigerant to flow therethrough (a range shown by a dotted line in FIG. 10B).

When the amount of supplied current exceeds the lower limit current value $I_1$, the main valve 7 starts to close. As the stroke becomes larger with the increase in the amount of supplied current, the opening degree of the main valve 7 becomes proportionally smaller. In the meantime, the sub-valve 8 starts to open. Until the stroke reaches $S_{11}$, however, since the clearance between the spool portion 114 and the sub-valve hole 32 is constant, the opening degree of the sub-valve 8 does not change. When the amount of supplied current exceeds $I_2$ and the stroke exceeds $S_{11}$, the spool portion 114 is removed from the sub-valve hole 32, which increases the increase rate of the opening degree of the sub-valve 8. This provides the bleeding function.

When the amount of supplied current becomes $I_3$ or larger and the stroke reaches $S_{12}$, the main valve 7 is fully closed until the amount of supplied current reaches the upper limit current value. The closing operation of the main valve 7 increases the suction pressure Ps. While the suction pressure Ps is relatively high, the communication passage 92 of the sub-valve element 139 is open. This enhances the bleeding effect. In the control characteristics, the increase rate of the opening degree of the sub-valve 8 is approximately zero in a first control range R11, while the sub-valve 8 has a predetermined increase rate of the opening degree in a second control range R12. According to the present modification, since the main valve 7 is fully closed during bleeding, the bleeding from the control chamber is facilitated, and quick switching to the maximum capacity operation is achieved.

Note that the whether or not the opening/closing mechanism operates is based on the magnitude of the suction pressure Ps sensed by the power element 6. In FIG. 10C, the horizontal axis represents the suction pressure Ps, and the vertical axis represents the valve opening degree. In FIG. 10C, the operation characteristic of the main valve 7 and the operation characteristic of the sub-valve 8 when the amount of current supplied to the solenoid 3 is Isol1 are represented by a solid line and an alternate long and short dashed line, respectively. The operation characteristic of the main valve 7 and the operation characteristic of the sub-valve 8 when the amount of supplied current is Isol2 are represented by a broken line and an alternate long and two short dashed line, respectively. In FIG. 10C, a dotted line represents the operation characteristic of the opening/closing mechanism. Isol2 is smaller than Isol1.

As shown in FIG. 10C, whether or not the opening/closing mechanism operates is dependent on the suction pressure Ps, but is not affected by the valve strokes and the amount of supplied current Isol. In addition, since a pressure difference ΔP between the suction pressure Ps when the main valve 7 is closed and the suction pressure Ps when the communication passage 92 is opened, that is, a pressure range (also referred to as a "dead zone" for convenience sake) in which the communication passage 92 is kept closed after the main valve 7 is closed is present, the communication passage 92 is prevented from unnecessarily opening during control of the main valve 7 and the sub-valve 8.

Second Embodiment

Figure 11:
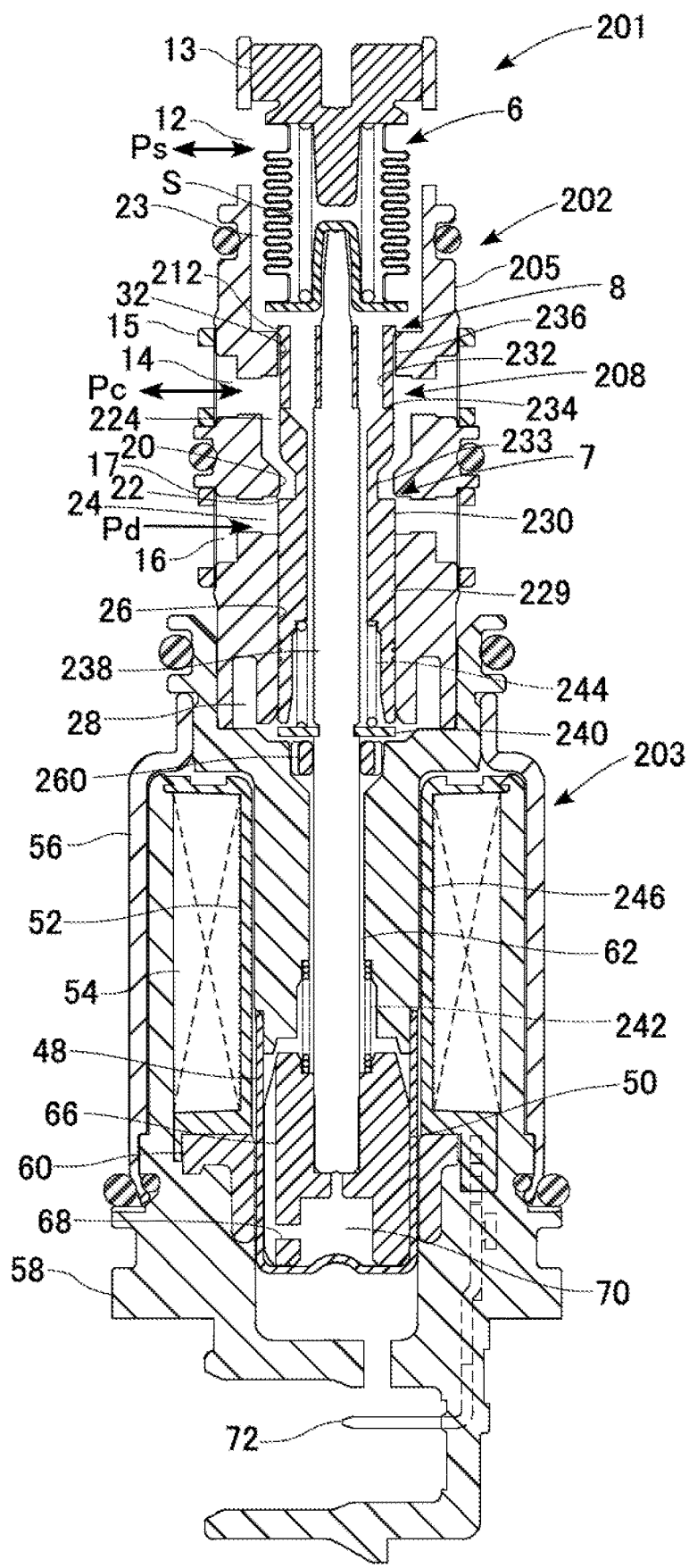
FIG. 11 is a cross-sectional view illustrating a structure of a control valve according to a second embodiment.

FIG. 11 is a cross-sectional view illustrating a structure of a control valve according to a second embodiment. The following description will be focused on differences from the first embodiment.

A control valve 201 is formed of an integral assembly of a valve unit 202 and a solenoid 203. The valve unit 202 includes a body 205, a power element 6, and the like. The control valve 201 has a structure in which the power element 6, a first sub-valve 8, a second sub-valve 208, a main valve 7, and the solenoid 203 are arranged in this order from one end thereof.

The body 205 has ports 12, 14, and 16 formed in this order from a top end thereof. A sub-valve chamber 224 is formed on a side of the valve chamber 24 opposite to the side of a guiding passage 26. The sub-valve chamber 224 communicates with the port 14 in the radial direction. A valve drive member 229 extends through the guiding passage 26 and a main valve hole 20. The valve drive member 229 has a stepped cylindrical shape and is slidable along the guiding passage 26 in the axial direction.

The valve drive member 229 has an upper half part being reduced in diameter, extending through the main valve hole 20, and constituting a partition part 233 that separates the inside from the outside of the valve drive member 229. A stepped portion formed at a middle part of the valve drive member 229 constitutes a main valve element 230. The main valve element 230 touches and leaves the main valve seat 22 to close and open the main valve 7. An upper part of the partition part 233 is tapered with a diameter increasing upward. A sub-valve seat 234 is formed at an upper end opening of the partition part 233. The sub-valve seat 234 functions as a movable valve seat that is displaced with the valve drive member 229.

An elongated actuating rod 238 is provided along the axis of the body 205. The actuating rod 238 has an upper half part extending through the valve drive member 229, and an upper portion of the upper half part has a diameter decreasing in a stepwise manner. A sub-valve element 236 is press-fitted around the stepped portion. An upper end of the actuating rod 238 passes through the sub-valve element 236 and is operably connectable with the power element 6. A lower end of the actuating rod 238 is connected with the plunger 50.

A spring support 240 is fitted into a middle portion in the axial direction of the actuating rod 238. A spring 244 (functioning as a "biasing member") that biases the valve drive member 229 in the closing direction of the main valve 7 is mounted between the valve drive member 229 and the spring support 240. During control of the main valve 7, the valve drive member 229 and the spring support 240 are tensioned by the elastic force of the spring 244, and the valve drive member 229 and the actuating rod 238 thus move integrally.

The sub-valve element 236 extends through the sub-valve hole 32, and is coaxially opposed to the valve drive member 229. A plurality of communication passages 232 (functioning as a "third passage") are formed through the sub-valve element 236 in the axial direction. An upper end portion of the sub-valve element 236 constitutes a spool portion 212. The spool portion 212 is inserted into and removed from the sub-valve hole 32 to close and open the first sub-valve 8. In addition, the sub-valve element 236 touches and leaves the sub-valve seat 234 to close and open the second sub-valve 208. The sub-valve element 236 and the valve drive member 229 constitute an "opening/closing mechanism" that opens the communication passages 232 while the main valve 7 is in the closed state depending on the magnitude of the current supplied to the solenoid 3.

A ring-shaped shaft support member 260 is press-fitted into an upper end part of a of the solenoid 203. The actuating rod 238 is supported by shaft support member 260 such that the actuating rod 238 is slidable in the axial direction. A communicating groove is formed in parallel with the axis on an outer surface of the shaft support member 260. Thus, the suction pressure Ps in the working chamber 28 is introduced into the solenoid through the communicating groove.

A spring 242 (functioning as a "biasing member") that biases the plunger 50 in the opening direction of the main valve 7 and the closing direction of the sub-valves 8 and 208 is mounted between the core 246 and the plunger 50. The spring 242 functions as a so-called off-spring that fully opens the main valve 7 while the solenoid 203 is powered off.

Figure 12:
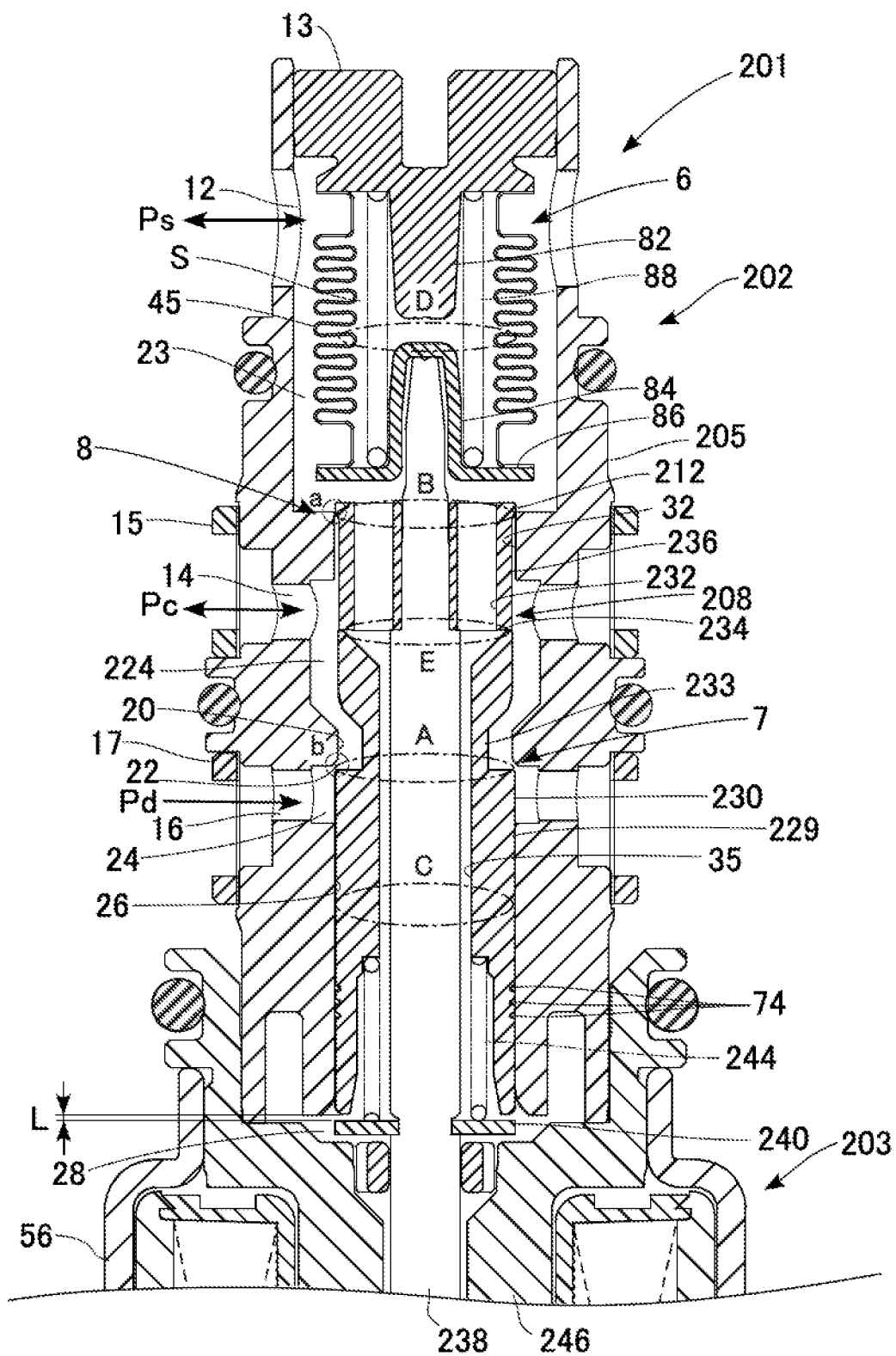
FIG. 12 is a partially enlarged cross-sectional view of the upper half of FIG. 11.

FIG. 12 is a partially enlarged cross-sectional view of the upper half of FIG. 11.

The actuating rod 238 is set such that an upper surface of the spring support 240 is spaced from a lower surface of the valve drive member 229 by at least a predetermined spacing L in a state in which the sub-valve element 236 is seated on the sub-valve seat 234 as illustrated in FIG. 12. The predetermined spacing L functions as a so-called "play (looseness)."

As the solenoid force is increased, the actuating rod 238 can be displaced relative to the valve drive member 229 to lift up the sub-valve element 236. This separates the sub-valve element 236 and the sub-valve seat 234 from each other to thus open the second sub-valve 208. In addition, the solenoid force can be directly transmitted to the main valve element 230 in a state in which the spring support 240 and the valve drive member 229 are engaged (in contact) with each other, and the main valve element 230 can be pressed with a great force in the valve closing direction of the main valve. This structure functions as a lock release mechanism for releasing a locked state where the operation of the main valve element 230 is locked owing to a foreign material stuck between the valve drive member 229 and the guiding passage 26 slidable relative to each other.

In the present embodiment, an effective pressure receiving diameter A (sealing diameter) of the main valve element 230 in the main valve 7, an effective pressure receiving diameter B (sealing diameter) of the sub-valve element 236 in the first sub-valve 8, and a sliding portion diameter C (sealing diameter) of the valve drive member 229 are set to be equal. Thus, the influences of the discharge pressure Pd, the control pressure Pc, and the suction pressure Ps acting on a combined unit of the main valve element 230 and the sub-valve element 236 (that is, a combined unit of the valve drive member 229 and the sub-valve element 236) connected with each other are cancelled. As a result, while the main valve 7 is controlled, the main valve element 230 performs the valve opening or closing operation on the basis of the suction pressure Ps received by the power element 6 in the working chamber 23. That is, the control valve 201 functions as a so-called Ps sensing valve.

In the present embodiment, the diameter D of the bellows 45 is set equal to the diameters A, B, and C. The diameter D, however, may be larger or smaller than the diameters A, B, C. In addition, in the present embodiment, a sealing diameter E of the sub-valve element 236 in the second sub-valve 208 is smaller than the sealing diameter A of the main valve element 230 in the main valve 7, and a pressure difference (Pc−Ps) between the control pressure Pc and the suction pressure Ps acts on the valve drive member 229 in the opening direction of the sub-valve. Such a pressure receiving structure and the biasing structure of the spring 244 constitute a "differential pressure valve opening mechanism" that opens the sub-valve when the pressure difference (Pc−Ps) has become a preset pressure difference $\Delta P_{set}$ or higher.

Next, operation of the control valve 201 will be described.

Figure 13:
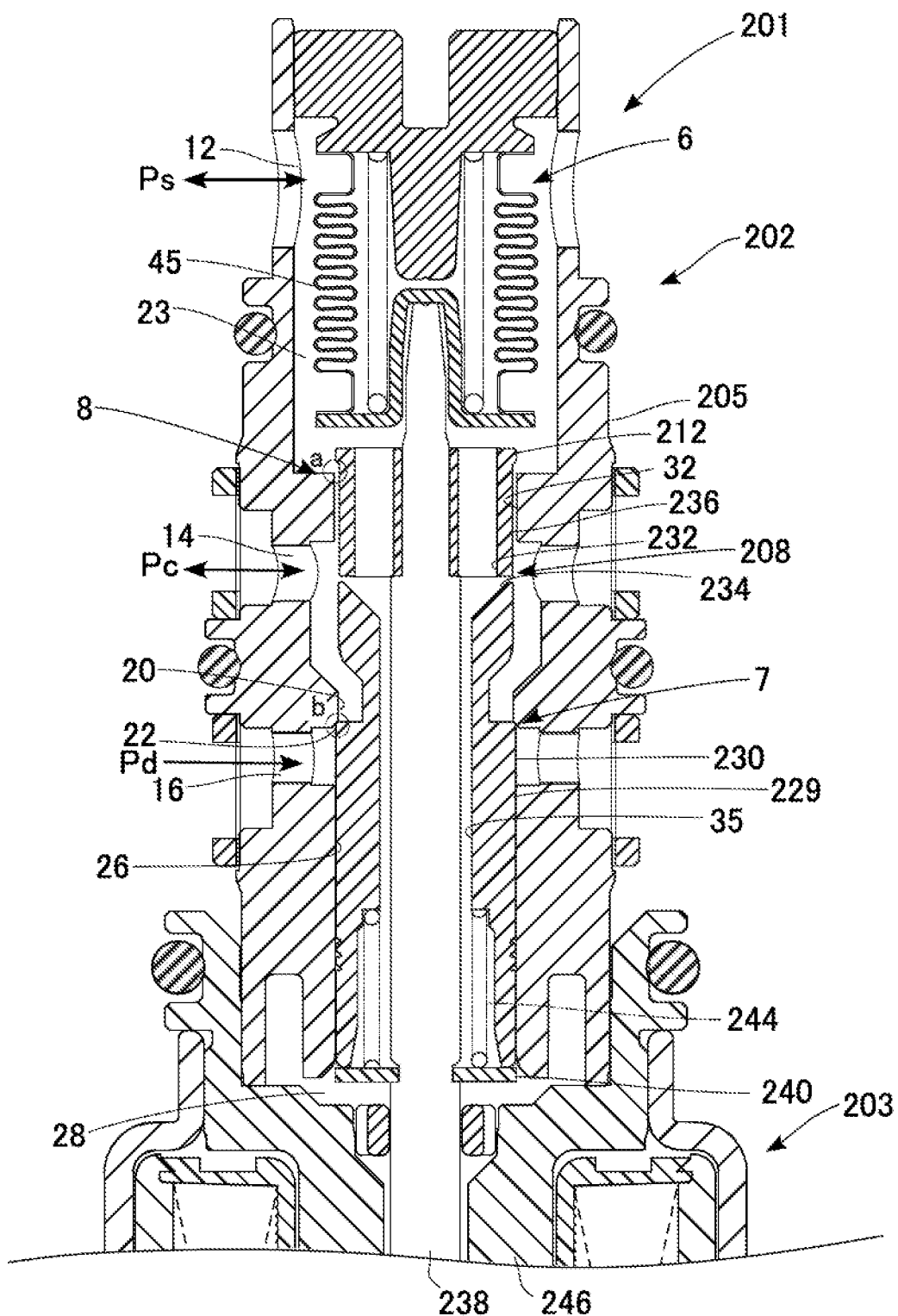
FIG. 13 illustrates operation of the control valve.

FIG. 13 illustrates operation of the control valve. FIG. 12, mentioned above, illustrates a state of the control valve 201 during minimum capacity operation. FIG. 13 illustrates a state in which the bleeding function is being carried out during maximum capacity operation (such as at the startup of the air conditioner). Hereinafter, description will be provided on the basis of FIG. 11 and with reference to FIGS. 12 and 13 where necessary.

While the solenoid 203 is powered off, the suction force does not act between the core 246 and the plunger 50. Thus, the main valve 7 is fully open, and the refrigerant at the discharge pressure Pd introduced through the port 16 passes through the fully-open main valve 7 and flows through the port 14 to the control chamber as illustrated in FIG. 12. As a result, the control pressure Pc increases, and the compressor performs the minimum capacity operation. At this point, the sub-valves 8 and 208 are closed. Since, however, the first sub-valve 8 is a spool valve, the refrigerant is released from the control chamber to the suction chamber at a predetermined flow rate. As a result, sufficient internal circulation of refrigerant within a range necessary for the compressor is provided.

In contrast, when control current (starting current) is supplied to the solenoid 203, such as at the startup of the air conditioner, the core 246 sucks (pulls) the plunger 50. This lifts up the actuating rod 238. In the meantime, the basing force of the spring 244 lifts up the valve drive member 229, causing the main valve element 230 to be seated on the main valve seat 22 to close the main valve 7 as illustrated in FIG. 13. The actuating rod 238 is further lifted up while being displaced relative to the valve drive member 229, and presses the sub-valve element 236 upward. Consequently, the sub-valve element 236 is separated from the sub-valve seat 234 to open the second sub-valve 208. In addition, the first sub-valve 8 is opened. This allows the refrigerant to be released from the control chamber to the suction chamber at a predetermined flow rate, which lowers the control pressure Pc. The compressor thus performs the maximum capacity operation. In other words, the bleeding function is carried out and the is quickly started.

When the suction pressure Ps becomes sufficiently low in this manner, the power element 6 expands to close the second sub-valve 208. When the control current to be supplied to the solenoid 203 is lowered depending on the preset temperature of air conditioning at this point, the valve drive member 229 and the power element 6 operate integrally and the main valve 7 is set at a predetermined opening degree. As a result, the refrigerant at the discharge pressure Pd controlled at a flow rate depending on the opening degree is introduced into the control chamber, and the compressor is then switched to operation with a capacity depending on the control current.

When the control current supplied to the electromagnetic coil 54 of the solenoid 203 is constant, the power element 6 senses the suction pressure Ps and controls the opening degree of the main valve 7. Consequently, the suction pressure Ps becomes closer to the preset pressure $P_{set}$.

Figure 15A:
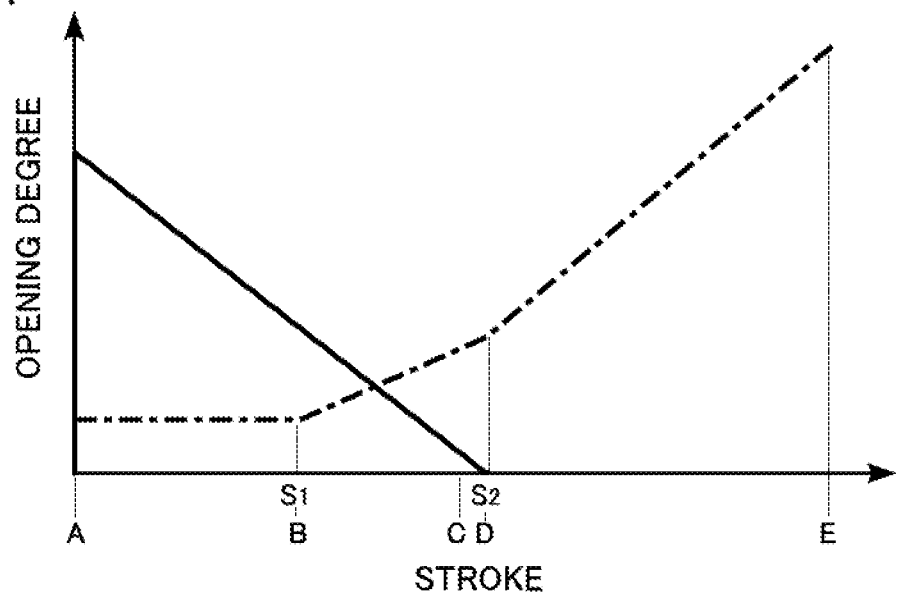
FIGS. 15A and 15B are graphs showing valve opening characteristics of a main valve and sub-valves.
Figure 15B:
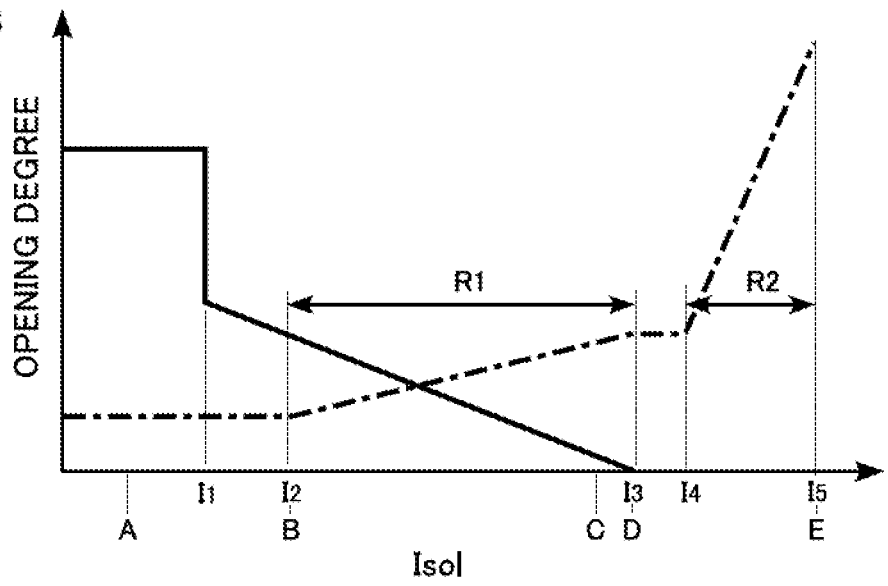

FIGS. 14A to 14E are partially enlarged cross-sectional views illustrating the structures and the operations of the main valve element and the sub-valve elements. FIGS. 14A to 14E illustrate processes of the operations from the fully-open state to the fully-closed state of the main valve. The lower drawings of FIGS. 14A to 14E illustrate the states of the main valve, and the upper drawings thereof illustrate the states of the sub-valves in the corresponding processes. The upper drawing of FIG. 14A is an enlarged view of part a in FIG. 12, and the lower drawing thereof is an enlarged view of part b in FIG. 12. The upper drawing of FIG. 14E is an enlarged view of part a in FIG. 13, and the lower drawing thereof is an enlarged view of part b in FIG. 13. FIGS. 15A and 15B are graphs showing valve opening characteristics of the main valve and the sub-valves. FIG. 15A shows the relation between the strokes of the valve elements and the valve opening degrees, and FIG. 15B shows the relation between the amount of current supplied to the solenoid and the valve opening degrees. In FIGS. 15A and 15B, a solid line represents the main valve 7, and an alternate long and short dashed line represents the sub-valves (combination of the first sub-valve 8 and the second sub-valve 208).

As illustrated in FIGS. 14A to 14E, the sub-valve element 236 has no touching/leaving portion. The spool portion 212 has a cylindrical portion 220 parallel to the axis of the sub-valve element 236, and a tapered portion 222 having an outer diameter decreasing downward. Thus, the sub-valve element 236 performs opening/closing operation with respect to the sub-valve hole 32, but does not fully close the first sub-valve 8. The main valve element 230 has no spool portion, and has an upper end portion that is a touching/leaving portion 250.

With this structure, the operations of the valves illustrated in FIGS. 14A to 14E appear as the control characteristics shown in FIGS. 15A and 15B. Specifically, while the amount of current supplied to the solenoid 203 is in a range from zero to a lower limit current value $I_1$, the stroke is zero and the main valve 7 is fully open. When the amount of supplied current exceeds $I_1$, the main valve 7 starts to close. As the stroke becomes larger with the increase in the amount of supplied current, the opening degree of the main valve 7 becomes proportionally smaller.

In the meantime, the characteristics of the sub-valve are such that the stroke is zero while the amount of current supplied to the solenoid 203 is in arrange from zero to $I_1$ (a lower limit current value), and that refrigerant flows through a clearance between the cylindrical portion 220 and the sub-valve hole 32, which functions as a first orifice that permits the refrigerant to flow therethrough. When the amount of supplied current exceeds $I_1$, the first sub-valve 8 starts to open. Until the stroke reaches $S_1$, however, since the clearance between the cylindrical portion 220 and the sub-valve hole 32 is constant, the opening degree of the first sub-valve 8 does not change. The second sub-valve 208 remains closed. When the amount of supplied current exceeds $I_2$, the opening degree of the first sub-valve 8 slowly increases until the stroke reaches $S_2$ from $S_1$. While the amount of supplied current is between $I_3$ and $I_4$, the main valve 7 closes, which increases the biasing force of the spring 244. The biasing force is then balanced with the solenoid force, and the opening degree of the sub-valve is kept constant. Since this range does not correspond to a capacity control range, this does not affect the control even if it is substantially a dead zone. When the amount of supplied current exceeds $I_4$ and the stroke exceeds $S_2$, the spool portion 212 is entirely removed from the sub-valve hole 32 and the second sub-valve 208 starts to open. As a result, the increase rate of the opening degree of the sub-valve increases. The opening degree of the sub-valve increases until the amount of supplied current reaches the upper limit current value. This provides the bleeding effect. The control characteristics also include a first control range R1 and a second control range R2, and the increase rate of the valve opening degree in the first control range R1 is smaller than that in the second control range R2.

As described above, in the present embodiment, since the sub-valve element 236 has a spool portion, the first sub-valve 8 and the second sub-valve 208 can be opened in a stepwise manner. This allows the efficiency of opening the sub-valve in response to the current supplied to the solenoid 203 to be switched in a stepwise manner as shown in FIG. 15B. Thus, the opening degree of the first sub-valve 8 is gradually increased in the control range of the main valve 7 in which the amount of supplied current is relatively small, and the opening degrees of the first sub-valve 8 and the second sub-valve 208 the sub-valve 8 are then increased to large opening degrees beyond the control range of the main valve 7.

Third Embodiment

Figure 16:
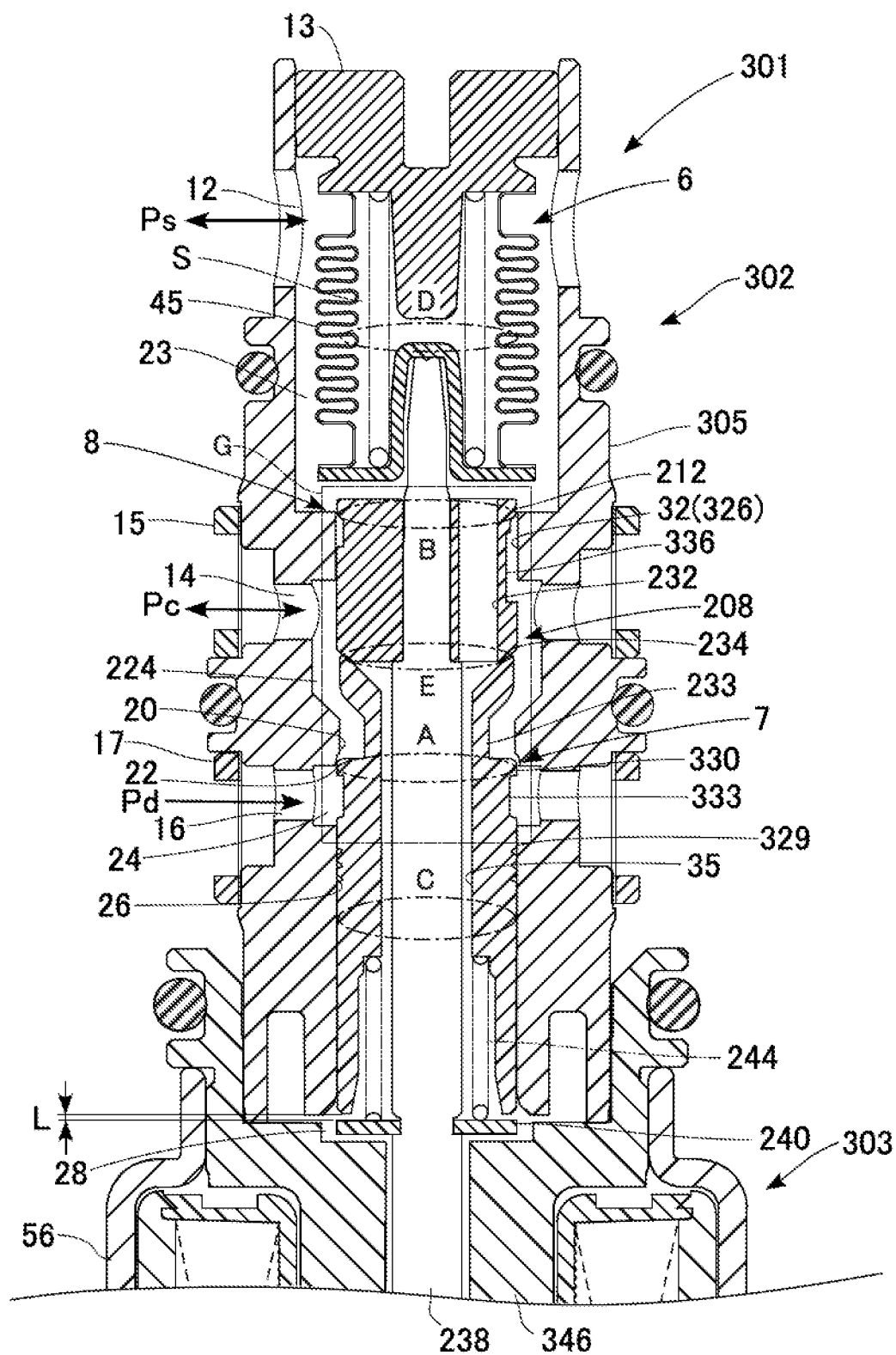
FIG. 16 is a cross-sectional view illustrating a structure of a control valve according to a third embodiment.

FIG. 16 is a cross-sectional view illustrating a structure of a control valve according to a third embodiment. The following description will be focused on differences from the second embodiment.

A control valve 301 is formed of an integral assembly of a valve unit 302 and a solenoid 303. The valve unit 302 includes a body 305, a power element 6, and the like. In the present embodiment, a sub-valve element 336 is slidably supported in the body 305. Specifically, a lower part of a sub-valve hole 32 serves as a guiding passage 326.

A core 346 of the solenoid 303 is not provided with a shaft support member 260 unlike the second embodiment. The actuating rod 238 is thus supported at two points, which are the position of the sub-valve element 336 and the position of the plunger 50 (see FIG. 11), that is, at an upper position and a lower position. This allows the actuating rod 238 to be more stably driven in the axial direction than that in the second embodiment.

In addition, an upper end of a valve drive member 329 and a lower end of the sub-valve element 336 have tapered surfaces that touch and leave each other. This allows the valve drive member 329 to be stable driven in the axial direction in such a manner that the upper end thereof is aligned and that a lower half part thereof is slidably supported in the guiding passage 26.

Figure 17:
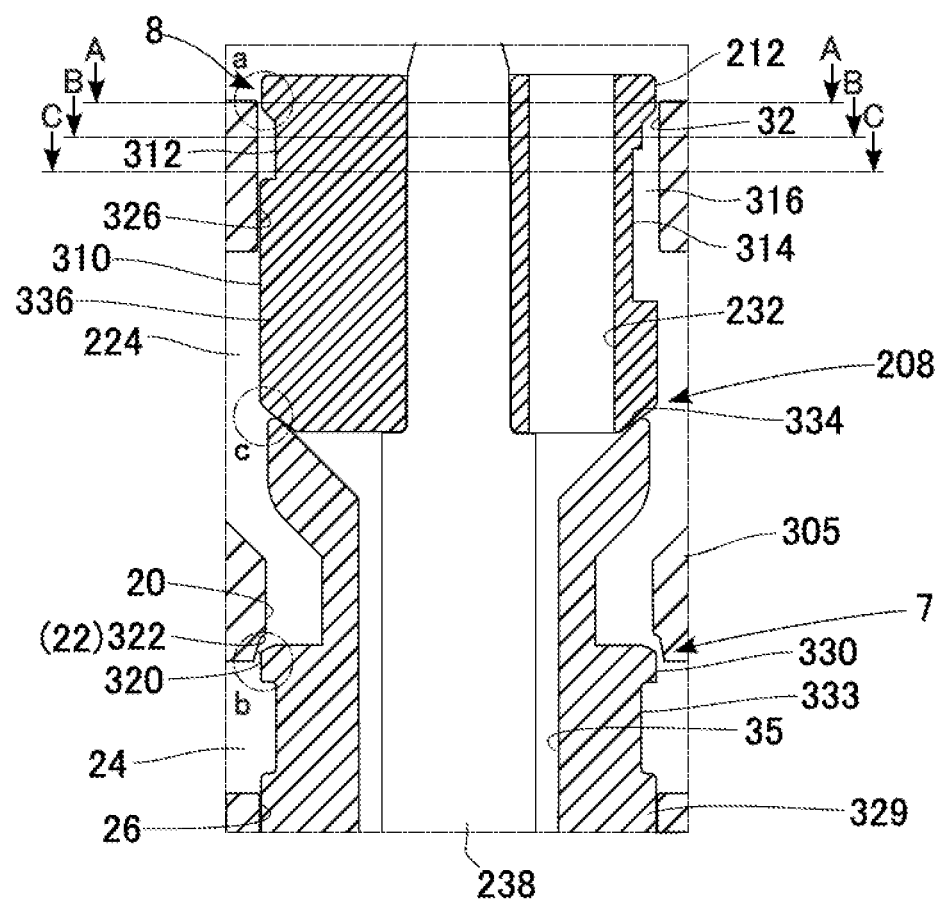
FIG. 17 is an enlarged view of part G in FIG. 16.

FIG. 17 is an enlarged view of part G in FIG. 16. FIGS. 18A to 18C are cross-sectional view taken along arrows in FIG. 17 and illustrating the sub-valve element 336 and surrounding structures illustrated in FIG. 17. FIG. 18A illustrates a cross section along A-A, FIG. 18B illustrates a cross section along B-B, and FIG. 18C illustrates a cross section along C-C shown by the arrows. For convenience of explanation, FIGS. 16 and 17 illustrate cross sections along D-D in FIG. 18A.

As illustrated in FIG. 17, an opening end of the main valve hole 20 has a two-step tapered shape including an upper taper 322 and a lower taper 320. The upper taper 322 constitutes the main valve seat 22. Regarding the angle (taper angle) of the main valve hole 20 with respect to the axis, the taper angle at the lower taper 320 is smaller than that at the upper taper 322. This allows the main valve 7 to gradually open relative to the amount by which a main valve element 330 is lifted from the main valve seat 22.

A stepped part 333 (a recess with a predetermined depth) for receiving foreign materials having entered through the port 16 is formed around an outer surface of the valve drive member 329 at a position inside the valve chamber 24. Thus, even if foreign materials are contained in the refrigerant introduced through the port 16, the foreign materials can be once received in the stepped part 333 of the valve drive member 329 and then guided toward the main valve hole 20. This makes foreign materials flowing along a wall of the valve drive member 329 less likely to directly hit the main valve seat 22, preventing or reducing occurrence of erosion on the main valve seat 22.

The sub-valve element 336 has a sub-valve element body 310 slidably supported in the guiding passage 326. The sub-valve element body 310 has an outer diameter larger than that of the spool portion 212. A reduced-diameter portion 312 having a small diameter is formed between the sub-valve element body 310 and the spool portion 212.

As illustrated in FIG. 18A, the communication passages 232 are formed at intervals of 90 degrees around the actuating rod 238. As illustrated in FIGS. 18B and 18C, the sub-valve element body 310 has four cut-outs 314 parallel to the axis, which are formed by so-called D-cut (D-shaped cutting), at circumferential positions thereof. The cut-outs 314 are so formed as to reach the reduced-diameter portion 312, which form communication passages 316 that always connect the sub-valve hole 32 with the sub-valve chamber 224.

With reference back to FIG. 17, a lower end of the sub-valve element 336 has a tapered shape with an outer diameter decreasing downward. In the present embodiment, this tapered surface is a spherical surface (curved surface) having a predetermined curvature. The sub-valve element 336 is thus seated on a sub-valve seat 334, having a tapered shape, of the valve drive member 329 in line contact with the sub-valve seat 334. This allows the valve drive member 329 and the sub-valve element 336 to be integrally and stably driven while the second sub-valve 208 (third valve) is closed. The sub-valve element 336 and the valve drive member 329 constitute an "opening/closing mechanism" that opens the communication passages 232 while the main valve 7 is in the closed state depending on the magnitude of the current supplied to the solenoid 303.

Figure 20A:
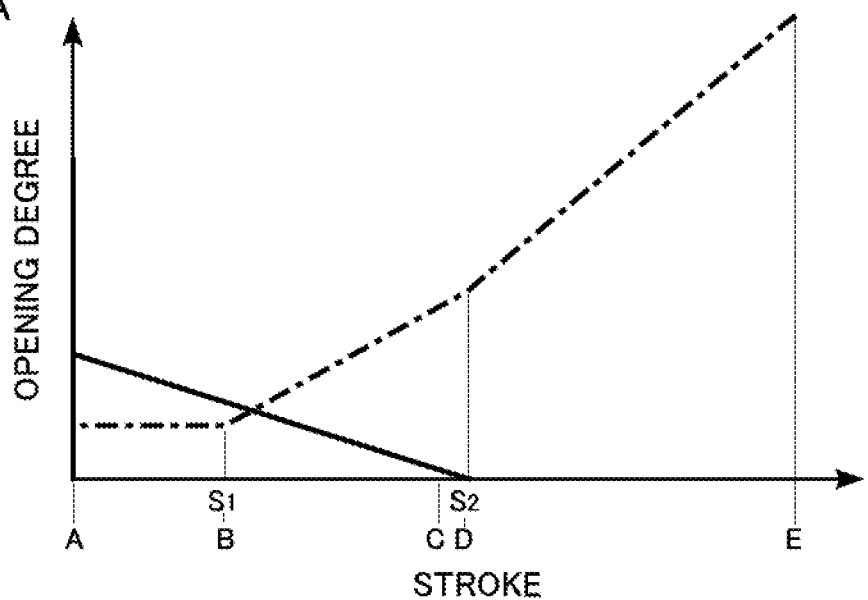
FIGS. 20A and 20B are graphs showing valve opening characteristics of a main valve and sub-valves.
Figure 20B:
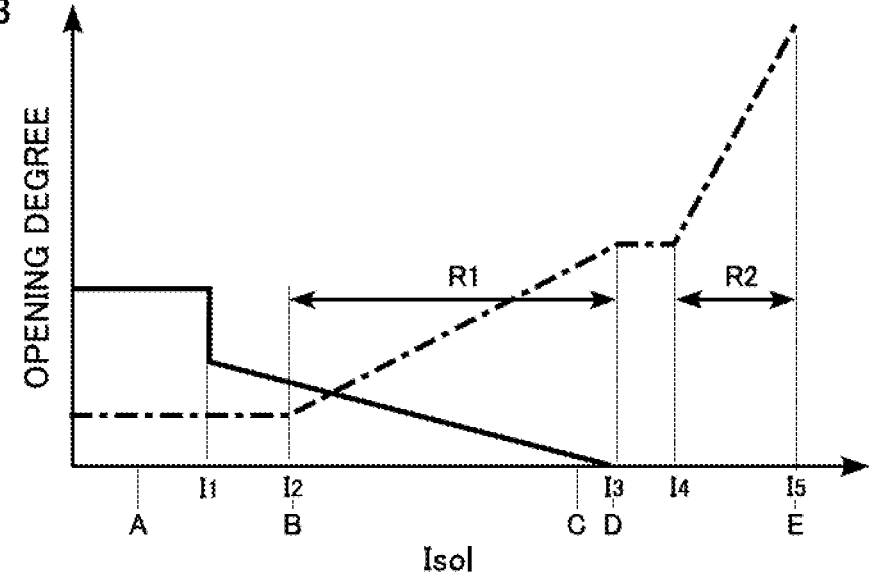

FIGS. 19A to 19E are partially enlarged cross-sectional views illustrating the operations of the main valve and the sub-valves (the first sub-valve and the second sub-valve). FIGS. 19A to 19E illustrate processes of the operations of from the fully-open state to the fully-closed state of the main valve, and until the sub-valves are opened. The lower drawings of FIGS. 19A to 19E illustrate the states of the main valve, the upper drawings thereof illustrate the states of the first sub-valve in the corresponding processes, and the middle drawings illustrate the states of the second sub-valve in the corresponding processes. The upper drawing of FIG. 19A is an enlarged view of part a in FIG. 17, the middle drawing thereof is an enlarged view of part c in FIG. 17, and the lower drawing thereof is an enlarged view of part b in FIG. 17. FIGS. 20A and 20B are graphs showing valve opening characteristics of the main valve and the sub-valves. FIG. 20A shows the relation between the strokes of the valve elements and the valve opening degrees, and FIG. 20B shows the relation between the amount of current supplied to the solenoid and the valve opening degrees. In FIGS. 20A and 20B, a solid line represents the main valve 7, and an alternate long and short dashed line represents the sub-valves (combination of the first sub-valve 8 and the second sub-valve 208).

With the structure described above, the operations of the valves illustrated in FIGS. 19A to 19E appear as the control characteristics shown in FIGS. 20A and 20B. The control characteristics have approximately the same tendency as those in the second embodiment. Since, however, the lower taper 320 is formed, the opening degree of the main valve 7 is relatively smaller. In the present embodiment as well, the efficiency of opening the sub-valve in response to the amount of current supplied to the solenoid 303 can be switched in a stepwise manner. Thus, the opening degree of the first sub-valve 8 is gradually increased in the control range of the main valve 7 in which the amount of supplied current is relatively small, and the opening degrees of the first sub-valve 8 and the second sub-valve 208 are then increased beyond the control range of the main valve 7.

The description of the present invention given above is based upon certain embodiments. The embodiments are intended to be illustrative only and it will be obvious to those skilled in the art that various modifications could be further developed within the technical idea underlying the present invention.

Although not mentioned in the embodiments, the opening degree (the opening area) of the orifice function provided by the spool portion of the main valve is preferably 70% or smaller, or more preferably 50% or smaller, of the opening degree of the orifice function provided by the spool portion of the sub-valve.

In the embodiments described above, a structure mainly including so-called "inflow control" for controlling the flow rate of refrigerant flowing from the discharge chamber into the control chamber has been presented. Alternatively, a structure mainly including so-called "outflow control" for controlling the flow rate of refrigerant flowing from the control chamber to the suction chamber may be used. Alternatively, a structure appropriately including both of inflow control and outflow control may be used.

In the embodiments described above, the so-called Ps sensing valve operating upon directly sensing the suction pressure Ps has been presented as the control valve. In a modification, the control valve may be a so-called Pc sensing valve operating upon sensing the control pressure Pc as a pressure to be sensed.

While springs that are biasing members (elastic members) are used for the springs 42, 44, 242, 244 etc. in the embodiments described above, it goes without saying that elastic materials such as rubber and plastics may be used instead.

Although not mentioned in the embodiments, to achieve a purpose of improving the startup performance of a compressor, a control valve as follows may be provided:

a control valve applicable to a variable displacement compressor having a suction chamber, a discharge chamber, and a control chamber, and having a discharge capacity varied by regulating a pressure in the control chamber, the control valve including:

a body having a first passage through which the discharge chamber and the control chamber communicate with each other, a second passage through which the control chamber and the suction chamber communicate with each other, a first valve hole formed in the first passage, and a second valve hole formed in the second passage;

a first valve element that regulates an opening degree of a first valve by moving toward and away from the first valve hole;

a second valve element that regulates an opening degree of a second valve by moving toward and away from the second valve hole;

a solenoid to generate a drive force in opening/closing directions of the valve elements depending on an amount of supplied current;

an actuating rod to transmit the drive force from the solenoid to the valve elements;

a pressure sensing part to sense a pressure in the suction chamber or a pressure in the control chamber, and generate a counterforce against the drive force from the solenoid depending on a magnitude of the sensed pressure; and an opening/closing mechanism to open and close a communication passage, through which the control chamber and the suction chamber can communicate with each other in addition to the second passage, depending on the magnitude of the pressure sensed by the pressure sensing part.

The opening/closing mechanism may open and close the communication passage by operably disconnecting and connecting a movable member, in which the communication passage is formed, and a pressure sensing member of the pressure sensing part from and with each other. The movable member may be the second valve element or the actuating rod.

The present invention is not limited to the above-described embodiments and modifications only, and the components may be further modified to arrive at various other embodiments without departing from the scope of the invention. Various other embodiments may be further formed by combining, as appropriate, a plurality of structural components disclosed in the above-described embodiments and modifications. Furthermore, one or some of all of the components exemplified in the above-described embodiments and modifications may be left unused or removed.

What is claimed is:

1. A control valve applicable to a variable displacement compressor having a suction chamber, a discharge chamber, and a control chamber, and having a discharge capacity varied by regulating a pressure in the control chamber, the control valve comprising:

a body having a first passage through which the discharge chamber and the control chamber communicate with each other, a second passage through which the control chamber and the suction chamber communicate with each other, a first valve hole formed in the first passage, and a second valve hole formed in the second passage;

a first valve element that regulates the opening degree of a first valve by moving toward and away from the first valve hole;

a second valve element that regulates an opening degree of a second valve by moving toward and away from the second valve hole;

a solenoid to generate a drive force in a closing direction of the first valve and an opening direction of the second valve depending on an amount of supplied current;

an actuating rod to transmit the drive force from the solenoid to the first and second valve elements;

a biasing member to generate a biasing force in an opening direction of the first valve and a closing direction of the second valve; and a pressure sensing part to sense a pressure in the suction chamber or a pressure in the control chamber, and generate a counterforce against the drive force from the solenoid depending on a magnitude of the sensed pressure, wherein the control valve has a state in which both of the first valve and the second valve are open when the amount of current supplied to the solenoid is increased from zero to an upper limit current value, and that an increase rate of an opening degree of the first valve is increased when the amount of current supplied to the solenoid is decreased, a predetermined lower limit current value being an inflection point of the increase, and the control valve further comprises an opening/closing mechanism of a third passage to open and close the third passage, through which the control chamber and the suction chamber can communicate with each other, depending on the amount of current supplied to the solenoid while the first valve is in a closed state.

2. The control valve according to claim 1, wherein the second valve element has a spool portion to be inserted into and removed from the second valve hole.

3. The control valve according to claim 2, wherein during control of the first valve, an orifice is formed between the spool portion and the second valve hole.

4. The control valve according to claim 3, wherein the spool portion has a tapered shape such that a clearance between the spool portion and the second valve hole becomes wider in the closing direction of the second valve.

5. The control valve according to claim 2, further comprising:

an opening/closing mechanism of a communication passage to open and close the communication passage, through which the control chamber and the suction chamber can communicate with each other, depending on the magnitude of the pressure sensed by the pressure sensing part.

6. The control valve according to claim 5,
wherein the opening/closing mechanism of the communication passage opens and closes the communication passage by operably disconnecting and connecting a pressure sensing member of the pressure sensing part and the second valve element from and with each other.

7. The control valve according to claim 2,
wherein the first valve element has a first spool portion to be inserted into and removed from the first valve hole, and
wherein an orifice is formed between the first spool portion and the first valve hole when the second valve starts to open and until the second valve becomes fully open.

8. The control valve according to claim 7,
wherein a valve seat is formed at an opening end of the first valve hole,
wherein the first valve element has a touching/leaving portion at a base end of the first spool portion, and
wherein the touching/leaving portion touches the valve seat to fully close the first valve.

9. The control valve according to claim 2,
wherein the body has a suction chamber communication port communicating with the suction chamber, a control chamber communication port communicating with the control chamber, and a discharge chamber communication port communicating with the discharge chamber, which are arranged in this order from a first end side of the body,
wherein the solenoid is positioned on a second end side of the body, and
wherein influence of a pressure in the discharge chamber acting on the first valve element and the second valve element is substantially cancelled.

10. A control valve applicable to a variable displacement compressor having a suction chamber, a discharge chamber, and a control chamber, and having a discharge capacity varied by regulating a pressure in the control chamber, the control valve comprising:

a first valve provided between the discharge chamber and the control chamber, to control a flow rate of refrigerant flowing from the discharge chamber to the control chamber;

a second valve and a third valve provided parallel to each other between the control chamber and the suction chamber, to control a flow rate of refrigerant flowing from the control chamber to the suction chamber;

a solenoid to generate a drive force in a closing direction of the first valve and an opening direction of the second valve depending on an amount of supplied current; and a pressure sensing part to sense a pressure in the suction chamber or a pressure in the control chamber, and generate a counterforce against the drive force from the solenoid depending on a magnitude of the sensed pressure, wherein the control valve has a state in which both of the first valve and the second valve are open when the amount of current supplied to the solenoid is increased from zero to an upper limit current value, and the second valve and the third valve are opened at the same time depending on the amount of current supplied to the solenoid while the first valve is a closed state.

* * * * *